(12) United States Patent
Holden

(10) Patent No.: US 11,831,472 B1
(45) Date of Patent: Nov. 28, 2023

(54) PRE-SCALER FOR ORTHOGONAL DIFFERENTIAL VECTOR SIGNALLING

(71) Applicant: KANDOU LABS SA, Lausanne (CH)

(72) Inventor: Brian Holden, Monte Sereno, CA (US)

(73) Assignee: KANDOU LABS SA, Lausanne (CH)

( * ) Notice: Subject to any disclaimer, the term of this patent is extended or adjusted under 35 U.S.C. 154(b) by 0 days.

(21) Appl. No.: 17/931,448

(22) Filed: Sep. 12, 2022

Related U.S. Application Data

(60) Provisional application No. 63/373,957, filed on Aug. 30, 2022.

(51) Int. Cl.
*H04L 25/02* (2006.01)
*H04L 27/26* (2006.01)

(52) U.S. Cl.
CPC ...... *H04L 25/0272* (2013.01); *H04L 27/2626* (2013.01)

(58) Field of Classification Search
CPC ............. H04L 25/0272; H04L 27/2626; H04L 1/0041; H04L 25/028; H04L 25/0292; H04L 25/08; H04B 3/00; H04B 3/02
See application file for complete search history.

(56) References Cited

U.S. PATENT DOCUMENTS

| | | |
|---|---|---|
| 3,196,351 A | 7/1965 | David |
| 3,970,795 A | 7/1976 | Allen |
| 4,163,258 A | 7/1979 | Ebihara et al. |
| 4,499,550 A | 2/1985 | Ray et al. |
| 5,053,974 A | 10/1991 | Penz |
| 5,166,956 A | 11/1992 | Baltus et al. |
| 5,311,516 A | 5/1994 | Kuznicki et al. |
| 5,331,320 A | 7/1994 | Cideciyan et al. |
| 5,412,689 A | 5/1995 | Chan et al. |

(Continued)

FOREIGN PATENT DOCUMENTS

| | | |
|---|---|---|
| CN | 1864346 A | 11/2006 |
| CN | 101854223 A | 10/2010 |

(Continued)

OTHER PUBLICATIONS

Abbasfar, Aliazam , "Generalized Differential Vector Signaling", IEEE International Conference on Communications, ICC '09, Jun. 14, 2009, 1-5 (5 pages).

(Continued)

*Primary Examiner* — Sophia Vlahos

(57) ABSTRACT

Pre-scaled orthogonal differential vector signalling (ODVS) techniques are described. The ODVS encoding schemes described herein generate one sub-channel for each bit by multiplying each bit by a different row in a transmitter encoding matrix to produce a set of sub-channels. Each wire carries a signal that is a superposition of elements from all of the sub-channels in the set. The transmitter encoding matrix is selected such that its rows (i.e. sub-channels) are mutual orthogonal. This means that the receiver can decode the signals received from all wires in concert to reliably recover the original bits. The transmitter encoding matrix is a Hadamard matrix in some cases. This disclosure is particularly focussed on ODVS techniques that apply a scaling factor, termed a 'pre-scaler', to a weaker sub-channel or sub-channels within the set of sub-channels so as to boost that/those sub-channel(s) relative to the other sub-channels.

20 Claims, 12 Drawing Sheets

(56) References Cited

U.S. PATENT DOCUMENTS

| | | |
|---|---|---|
| 5,449,895 A | 9/1995 | Hecht et al. |
| 5,553,097 A | 9/1996 | Dagher |
| 5,856,935 A | 1/1999 | Moy et al. |
| 5,982,954 A | 11/1999 | Delen et al. |
| 6,005,895 A | 12/1999 | Perino et al. |
| 6,084,883 A | 7/2000 | Norrell et al. |
| 6,084,958 A | 7/2000 | Blossom |
| 6,097,732 A | 8/2000 | Jung |
| 6,111,895 A | 8/2000 | Miller et al. |
| 6,154,498 A | 11/2000 | Dabral et al. |
| 6,226,330 B1 | 5/2001 | Mansur |
| 6,278,740 B1 | 8/2001 | Nordyke |
| 6,317,465 B1 | 11/2001 | Akamatsu et al. |
| 6,359,931 B1 | 3/2002 | Perino et al. |
| 6,452,420 B1 | 9/2002 | Wong |
| 6,483,828 B1 | 11/2002 | Balachandran et al. |
| 6,504,875 B2 | 1/2003 | Perino et al. |
| 6,556,628 B1 | 4/2003 | Poulton et al. |
| 6,621,427 B2 | 9/2003 | Greenstreet |
| 6,621,945 B2 | 9/2003 | Bissessur |
| 6,650,638 B1 | 11/2003 | Walker et al. |
| 6,661,355 B2 | 12/2003 | Cornelius et al. |
| 6,766,342 B2 | 7/2004 | Kechriotis |
| 6,865,236 B1 | 3/2005 | Terry |
| 6,876,317 B2 | 4/2005 | Sankaran |
| 6,898,724 B2 | 5/2005 | Chang |
| 6,954,492 B1 | 10/2005 | Williams |
| 6,990,138 B2 | 1/2006 | Bejjani et al. |
| 6,999,516 B1 | 2/2006 | Rajan |
| 7,023,817 B2 | 4/2006 | Kuffner et al. |
| 7,039,136 B2 | 5/2006 | Olson et al. |
| 7,075,996 B2 | 7/2006 | Simon et al. |
| 7,127,003 B2 | 10/2006 | Rajan et al. |
| 7,142,612 B2 | 11/2006 | Horowitz et al. |
| 7,167,523 B2 | 1/2007 | Mansur |
| 7,180,949 B2 | 2/2007 | Kleveland et al. |
| 7,184,483 B2 | 2/2007 | Rajan |
| 7,269,212 B1 | 9/2007 | Chau et al. |
| 7,356,213 B1 | 4/2008 | Cunningham et al. |
| 7,358,869 B1 | 4/2008 | Chiarulli et al. |
| 7,496,130 B2 | 2/2009 | Rumney |
| 7,633,850 B2 | 12/2009 | Ahn |
| 7,656,321 B2 | 2/2010 | Wang |
| 7,706,456 B2 | 4/2010 | Laroia et al. |
| 7,746,764 B2 | 6/2010 | Rawlins et al. |
| 7,868,790 B2 | 1/2011 | Bae |
| 7,869,546 B2 | 1/2011 | Tsai |
| 7,899,653 B2 | 3/2011 | Hollis |
| 8,050,332 B2 | 11/2011 | Chung et al. |
| 8,055,095 B2 | 11/2011 | Palotai et al. |
| 8,149,906 B2 | 4/2012 | Saito et al. |
| 8,159,375 B2 | 4/2012 | Abbasfar |
| 8,159,376 B2 | 4/2012 | Abbasfar |
| 8,199,849 B2 | 6/2012 | Oh et al. |
| 8,199,863 B2 | 6/2012 | Chen et al. |
| 8,218,670 B2 | 7/2012 | Abou |
| 8,245,094 B2 | 8/2012 | Jiang et al. |
| 8,279,745 B2 | 10/2012 | Dent |
| 8,279,976 B2 | 10/2012 | Lin et al. |
| 8,284,848 B2 | 10/2012 | Nam et al. |
| 8,289,914 B2 | 10/2012 | Li et al. |
| 8,295,250 B2 | 10/2012 | Gorokhov et al. |
| 8,365,035 B2 | 1/2013 | Hara |
| 8,472,513 B2 | 6/2013 | Malipatil et al. |
| 8,498,368 B1 | 7/2013 | Husted et al. |
| 8,520,493 B2 | 8/2013 | Goulahsen |
| 8,539,318 B2 | 9/2013 | Shokrollahi et al. |
| 8,577,284 B2 | 11/2013 | Seo et al. |
| 8,588,254 B2 | 11/2013 | Diab et al. |
| 8,588,280 B2 | 11/2013 | Oh et al. |
| 8,593,305 B1 | 11/2013 | Tajalli et al. |
| 8,620,166 B2 | 12/2013 | Guha |
| 8,644,497 B2 | 2/2014 | Clausen et al. |
| 8,649,445 B2 | 2/2014 | Cronie et al. |
| 8,687,968 B2 | 4/2014 | Nosaka et al. |
| 8,718,184 B1 | 5/2014 | Cronie et al. |
| 8,731,039 B1 | 5/2014 | Sarrigeorgidis et al. |
| 8,755,426 B1 | 6/2014 | Cronie et al. |
| 8,773,964 B2 | 7/2014 | Hsueh et al. |
| 8,780,687 B2 | 7/2014 | Clausen et al. |
| 8,831,440 B2 | 9/2014 | Yu et al. |
| 8,879,660 B1 | 11/2014 | Peng et al. |
| 8,938,171 B2 | 1/2015 | Tang et al. |
| 8,949,693 B2 | 2/2015 | Ordentlich et al. |
| 8,989,317 B1 | 3/2015 | Holden et al. |
| 8,996,740 B2 | 3/2015 | Wiley et al. |
| 9,015,566 B2 | 4/2015 | Cronie et al. |
| 9,071,476 B2 | 6/2015 | Fox et al. |
| 9,077,386 B1 | 7/2015 | Holden et al. |
| 9,100,232 B1 | 8/2015 | Hormati et al. |
| 9,197,470 B2 | 11/2015 | Okunev |
| 9,246,713 B2 | 1/2016 | Shokrollahi |
| 9,251,873 B1 | 2/2016 | Fox et al. |
| 9,288,082 B1 | 3/2016 | Ulrich et al. |
| 9,288,089 B2 | 3/2016 | Cronie et al. |
| 9,331,962 B2 | 5/2016 | Lida et al. |
| 9,362,974 B2 | 6/2016 | Fox et al. |
| 9,363,114 B2 | 6/2016 | Shokrollahi et al. |
| 9,401,828 B2 | 7/2016 | Cronie et al. |
| 9,432,082 B2 | 8/2016 | Ulrich et al. |
| 9,461,862 B2 | 10/2016 | Holden et al. |
| 9,479,369 B1 | 10/2016 | Shokrollahi |
| 9,509,437 B2 | 11/2016 | Shokrollahi |
| 9,537,644 B2 | 1/2017 | Jones et al. |
| 9,634,797 B2 | 4/2017 | Benammar et al. |
| 9,667,379 B2 | 5/2017 | Cronie et al. |
| 9,710,412 B2 | 7/2017 | Sengoku |
| 10,055,372 B2 | 8/2018 | Shokrollahi |
| 10,693,688 B2 | 6/2020 | Tajalli |
| 2001/0006538 A1 | 7/2001 | Simon et al. |
| 2001/0055294 A1 | 12/2001 | Motoyoshi |
| 2002/0044316 A1 | 4/2002 | Myers |
| 2002/0152340 A1 | 10/2002 | Dreps et al. |
| 2002/0174373 A1 | 11/2002 | Chang |
| 2002/0181607 A1 | 12/2002 | Izumi |
| 2003/0086366 A1 | 5/2003 | Branlund et al. |
| 2003/0087634 A1 | 5/2003 | Raghavan et al. |
| 2004/0057525 A1 | 3/2004 | Rajan et al. |
| 2004/0146117 A1 | 7/2004 | Subramaniam et al. |
| 2004/0155802 A1 | 8/2004 | Lamy et al. |
| 2004/0161019 A1 | 8/2004 | Raghavan et al. |
| 2004/0239374 A1 | 12/2004 | Hori |
| 2005/0213686 A1 | 9/2005 | Love et al. |
| 2006/0013331 A1 | 1/2006 | Choi et al. |
| 2006/0056538 A1 | 3/2006 | Nam et al. |
| 2006/0126751 A1 | 6/2006 | Bessios |
| 2006/0159005 A1 | 7/2006 | Rawlins et al. |
| 2006/0251421 A1 | 11/2006 | Arnon |
| 2006/0291589 A1 | 12/2006 | Eliezer et al. |
| 2007/0030796 A1 | 2/2007 | Green |
| 2007/0070967 A1 | 3/2007 | Yang et al. |
| 2008/0043677 A1 | 2/2008 | Kim et al. |
| 2008/0104374 A1 | 5/2008 | Mohamed |
| 2008/0192621 A1 | 8/2008 | Suehiro |
| 2008/0316070 A1 | 12/2008 | Van et al. |
| 2009/0046009 A1 | 2/2009 | Fujii |
| 2009/0059782 A1 | 3/2009 | Cole |
| 2009/0110106 A1 | 4/2009 | Wornell et al. |
| 2009/0154604 A1 | 6/2009 | Lee et al. |
| 2010/0046644 A1 | 2/2010 | Mazet |
| 2010/0054355 A1 | 3/2010 | Kinjo et al. |
| 2010/0081451 A1 | 4/2010 | Mueck et al. |
| 2010/0215112 A1 | 8/2010 | Tsai et al. |
| 2010/0235673 A1 | 9/2010 | Abbasfar |
| 2010/0296556 A1 | 11/2010 | Rave et al. |
| 2010/0309964 A1 | 12/2010 | Oh et al. |
| 2011/0014865 A1 | 1/2011 | Seo et al. |
| 2011/0018749 A1 | 1/2011 | Muto et al. |
| 2011/0122767 A1 | 5/2011 | Dent |
| 2011/0134678 A1 | 6/2011 | Sato et al. |
| 2011/0235501 A1 | 9/2011 | Goulahsen |
| 2011/0268225 A1 | 11/2011 | Cronie et al. |
| 2011/0286497 A1 | 11/2011 | Nervig |
| 2011/0299555 A1 | 12/2011 | Cronie et al. |

(56) References Cited

U.S. PATENT DOCUMENTS

| | | |
|---|---|---|
| 2011/0302478 A1 | 12/2011 | Cronie et al. |
| 2012/0213299 A1 | 8/2012 | Cronie et al. |
| 2012/0257683 A1 | 10/2012 | Schwager et al. |
| 2013/0010892 A1 | 1/2013 | Cronie et al. |
| 2013/0013870 A1 | 1/2013 | Cronie et al. |
| 2013/0114392 A1 | 5/2013 | Sun et al. |
| 2013/0202001 A1 | 8/2013 | Zhang |
| 2013/0259113 A1 | 10/2013 | Kumar |
| 2014/0006649 A1 | 1/2014 | Wiley et al. |
| 2014/0177645 A1 | 6/2014 | Cronie et al. |
| 2014/0254642 A1 | 9/2014 | Fox et al. |
| 2015/0078479 A1 | 3/2015 | Whitby-Strevens |
| 2015/0222458 A1 | 8/2015 | Hormati et al. |
| 2015/0236885 A1 | 8/2015 | Ling et al. |
| 2015/0249559 A1 | 9/2015 | Shokrollahi et al. |
| 2015/0333940 A1 | 11/2015 | Shokrollahi |
| 2015/0349835 A1 | 12/2015 | Fox et al. |
| 2015/0365263 A1 | 12/2015 | Zhang et al. |
| 2015/0380087 A1 | 12/2015 | Mittelholzer et al. |
| 2015/0381232 A1 | 12/2015 | Ulrich |
| 2015/0381768 A1 | 12/2015 | Fox et al. |
| 2016/0020824 A1 | 1/2016 | Ulrich et al. |
| 2016/0036616 A1 | 2/2016 | Holden et al. |
| 2016/0218894 A1 | 7/2016 | Fox et al. |
| 2016/0338040 A1 | 11/2016 | Lee et al. |
| 2016/0380787 A1 | 12/2016 | Hormati et al. |
| 2017/0272285 A1 | 9/2017 | Shokrollahi et al. |
| 2019/0073332 A1* | 3/2019 | Amiri ................ G06F 13/4208 |
| 2019/0103903 A1 | 4/2019 | Yang |
| 2020/0321778 A1 | 10/2020 | Gharibdoust et al. |
| 2021/0297292 A1 | 9/2021 | Hormati |

FOREIGN PATENT DOCUMENTS

| | | |
|---|---|---|
| CN | 114142964 A | 3/2022 |
| JP | 2003163612 A | 6/2003 |
| JP | 4394755 B2 | 10/2009 |
| WO | 2005032000 A1 | 4/2005 |
| WO | 2009084121 A1 | 7/2009 |
| WO | 2010031824 A1 | 3/2010 |
| WO | 2019241081 A1 | 12/2019 |

OTHER PUBLICATIONS

Anonymous, "Constant-weight code", Wikipedia.org, retrieved on Feb. 6, 2017, (3 pages).

Counts, Lew, et al., "One-Chip "Slide Rule" Works with Logs, Antilogs for Real-Time Processing", Analog Devices, Computational Products 6, Reprinted from Electronic Design, May 2, 1985, 3-9 (7 pages).

Dasilva, Victor, et al., "Multicarrier Orthogonal CDMA Signals for Quasi-Synchronous Communication Systems", IEEE Journal on Selected Areas in Communications, vol. 12, No. 5, Jun. 1994, 842-852 (11 pages).

Farzan, Kamran, et al., "Coding Schemes for Chip-to-Chip Interconnect Applications", IEEE Transactions on Very arge Scale Integration (VLSI) Systems, vol. 14, No. 4, Apr. 2006, 393-406 (14 pages).

Giovaneli, Carlos Lopez, et al., "Space-Frequency Coded OFDM System for Multi-Wire Power Line Communications", Power Line Communications and Its Applications, 2005 International Symposium on Vancouver, BC, Canada, IEEE XP-002433844, Apr. 6-8, 2005, 191-195 (5 pages).

Healey, Adam, et al., "A Comparison of 25 Gbps NRZ & PAM-4 Modulation used in Legacy & Premium Backplane Channels", Tyco Electronics Corporation, DesignCon 2012, Jan. 2012, 1-16 (16 pages).

Holden, Brian, "An exploration of the technical feasibility of the major technology options for 400GE backplanes", IEEE 802.3 400GE Study Group, Geneva, CH, Jul. 16, 2013, 1-18 (18 pages).

Holden, Brian, "Simulation results for NRZ, ENRZ & PAM-4 on 16-wire full-sized 400GE backplanes", IEEE 802.3 400GE Study Group, York, UK, Sep. 2, 2013, 1-19 (19 pages).

Holden, Brian, "Using Ensemble NRZ Coding for 400GE Electrical Interfaces", IEEE 802.3 400GE Study Group, May 17, 2013, 1-24 (24 pages).

Jiang, Anxiao, et al., "Rank Modulation for Flash Memories", IEEE Transactions of Information Theory, vol. 55, No. 6, Jun. 2009, 2659-2673 (16 pages).

Oh, Dan, et al., "Pseudo-Differential Vector Signaling for Noise Reduction in Single-Ended Signaling Systems", DesignCon 2009, Rambus Inc., Jan. 2009, (22 pages).

Penttinen, Jyrki, et al., "Performance Model for Orthogonal Sub Channel in Noise-limited Environment", Sixth International Conference on Wireless and Mobile Communications, 2010, 56-61 (6 pages).

Poulton, John, "Multiwire Differential Signaling", UNC-CH Department of Computer Science Version 1.1, Aug. 6, 2003, 1-20 (20 pages).

She, James, et al., "A Framework of Cross-Layer Superposition Coded Multicast for Robust IPTV Services over Wimax", IEEE Wireless Communications and Networking Conference, Apr. 15, 2008, 3139-3144 (6 pages).

Skliar, Osvaldo, et al., "A Method For the Analysis of Signals: the Square-Wave Method", Revista de Matematica: Teoria y Aplicaciones, vol. 15, No. 2, Mar. 2008, 109-129 (21 pages).

Slepian, David, "Permutation Modulation", Proceedings of the IEE, vol. 53, No. 3, Mar. 1965, 228-236 (9 pages).

Wada, Tadahiro, et al., "A Study on Orthogonal Multi-Code CDMA Systems Using Constant Amplitude Coding", Technical Report of IEICE, vol. 97, No. 132, Jun. 24, 1997, 19-24 (6 pages).

Wang, Xin, et al., "Applying CDMA Technique to Network-on-Chip", IEEE Transactions on Very Large Scale Integration (VLSI) Systems, vol. 15, No. 10, Oct. 1, 2007, 1091-1100 (10 pages).

Zhang, Geng, et al., "A CNRZ-7 Based Wireline Transceiver With High-Bandwidth-Density, Low-Power for D2D Communication", IEEE Access, vol. 10, 2022, Sep. 19, 202, 96556-96567 (12 pages).

International Search Report and Written Opinion for PCT/US22/76305, dated Apr. 28, 2023, 1-12 (12 pages.

* cited by examiner

FIG. 10

| | Wire 0 | Wire 1 | Wire 2 | Wire 3 | Wire 4 | Wire 5 | Wire 6 | Wire 7 |
|---|---|---|---|---|---|---|---|---|
| 0 | 0 | 0 | 0 | 0 | 0 | 0 | + | . |
| 1 | 0 | 0 | 0 | 0 | + | + | . | . |
| 2 | 0 | 0 | 0 | 0 | + | . | 0 | 0 |
| 3 | + | + | + | + | . | . | . | . |
| 4 | 0 | 0 | + | . | 0 | 0 | 0 | 0 |
| 5 | + | + | . | . | 0 | 0 | 0 | 0 |
| 6 | + | . | 0 | 0 | 0 | 0 | 0 | 0 |

PRE-SCALER FOR ORTHOGONAL DIFFERENTIAL VECTOR SIGNALLING

CROSS-REFERENCE TO RELATED APPLICATIONS

This application claims the benefit of U.S. Provisional Application No. 63/373,957, entitled "PRE-SCALAR FOR ORTHOGONAL DIFFERENTIAL VECTOR SIGNALLING", filed Aug. 30, 2022, which is hereby incorporated by reference in its entirety for all purposes.

REFERENCES

The following references are herein incorporated by reference in their entirety for all purposes:

U.S. application Ser. No. 14/829,388, filed Aug. 18, 2015, published as U.S. Publication No. 2015/0381232 on Dec. 31, 2015, which granted as U.S. Pat. No. 9,544,015 on Jan. 10, 2017, entitled "Multilevel Driver for High Speed Chip to Chip Communications, naming Roger Ulrich (referred to herein as [Ulrich]).

U.S. application Ser. No. 15/194,497, filed Jun. 27, 2016, published as U.S. Publication No. 2016/0380787 on Dec. 29, 2016, which granted as U.S. Pat. No. 9,832,046 on Nov. 28, 2017, entitled "High Speed Communications System", naming Ali Hormati, Armin Tajalli, and Amin Shokrollahi (referred to herein as [Hormati]).

U.S. application Ser. No. 16/236,012, filed Dec. 28, 2018, published as U.S. Publication No. 2019/0207793 on Jul. 4, 2019, which granted as U.S. Pat. No. 10,693,688 on Jun. 23, 2020, entitled "Synchronously-Switched Multi-Input Demodulating Comparator", naming Armin Tajalli (referred to herein as [Tajalli]),

BACKGROUND

In communication systems, information often needs to be transmitted from one physical location to another physical location. Usually it is desirable for the information to be transmitted in a reliable manner as quickly as possible. Often the ability to transfer the information robustly is a further consideration—that is, the information should be recovered by the receiver after transmission with as few errors as possible.

A commonplace mechanism for transmission of information is a serial communication link. At a high level, a serial communication link includes a transmitter coupled to a receiver via one or more wires. The transmitter encodes information that is to be sent to the receiver in some manner and transmits the resulting encoded information over the wire(s) as electrical signals. The receiver detects the electrical signals and recovers the encoded information, e.g. by decoding.

The simplest serial link uses wires connected to ground or some other reference voltage, where each wire carries information in the form of electrical signals. This type of arrangement is known as single-ended signalling (SES). A problem with such links is that they can generate significant levels of electromagnetic interference (EMI) and can also be vulnerable to fluctuations in the reference voltage that can cause errors in information recovery at the receiver.

To address some of the problems with SES, differential signalling can instead be used. In a differential signalling communication system information is transmitted over pairs of wires that carry electrical signals of equal magnitude but opposite polarity. Each pair of wires is often referred to as a differential pair, with the information channel that the pair of wires collectively represents often being called a link. The receiver determines the difference between the signal transmitted on each wire in the pair and recovers the information encoded by the transmitter based on this difference.

While differential signalling can address the issues noted above in respect of SES, a problem with differential signalling is that it has a relatively low pin efficiency. Pin efficiency can be defined as the ratio of the number of bits that are transmitted per unit interval to the number of wires used to transmit the bits. In the case of SES, the pin efficiency is 1 since in one unit interval one bit is carried by one wire. In contrast, differential signalling has a pin efficiency of 0.5 because one bit is carried over two wires in each unit interval.

It would thus be desirable to have a technique for transmitting information over wires that maintains at least some of the advantages of differential signalling but which also improves upon the pin efficiency of differential signalling. This technique would also preferably provide reliable signalling with a low bit error ratio (BER).

BRIEF DESCRIPTION

Pre-scaled orthogonal differential vector signalling (ODVS) techniques are described that make use of more than two wires to transmit information. The ODVS encoding schemes described herein utilize a plurality of orthogonal subchannels to convey data symbols over a multiwire bus. In one form, an encoder effectively applies the data symbol value to a row of a transmitter encoding matrix, and then sums the columns to obtain the wire signal levels. Thus, then encoder modulates one sub-channel for each data symbol (e.g., a single bit such as a PAM-2 symbol, a "trit" or PAM-3 symbol representing ~1.5 bits, or two bits represented by a PAM-4 data symbol, etc.) by multiplying each data symbol by a different row in a transmitter encoding matrix to produce a set of sub-channels. Each wire carries a signal that is a superposition of elements from all of the sub-channels in the set. The transmitter encoding matrix is selected such that its rows (i.e. sub-channels) are mutual orthogonal. This means that the receiver can decode the signals received from all wires in concert to reliably recover the original bits. The transmitter encoding matrix is a Hadamard matrix in some cases. This disclosure is particularly focussed on ODVS techniques that apply a scaling factor, termed a 'pre-scaler', to a weaker sub-channel or sub-channels within the set of sub-channels so as to boost that/those sub-channel(s) relative to the other sub-channels. This can result in more robust ODVS techniques with a lower bit error ratio (BER). A particular application of this method is when the OVDS link is carried over a channel composed of multiple set of wires that are organized in pairs.

A communication system according to an embodiment comprises: a multi-wire bus having N wires arranged in pairs of wires, N being an integer greater than 2 and being a multiple of two; an orthogonal differential vector signalling encoder configured to receive a set of input bits and to responsively generate a set of symbols of a codeword of a vector signalling code, the codeword corresponding to a weighted summation of a plurality of sub-channel vectors that correspond to rows of a transmitter encoding matrix, the plurality of sub-channel vectors comprising at least one cross-pair sub-channel vector having same-signed vector components carried by at least one of the pairs of wires; and a set of drivers configured to transmit each symbol of the codeword over a respective wire of the multi-wire bus by driving the respective wire with a wire signal level, wherein for a given symbol of the vector signalling code, each driver of the set of drivers is configured to drive the wire signal level of the respective wire responsive to modulations of the at least one cross-pair sub-channel vector by a first amount more than modulations of at least one other sub-channel vector.

A method according to an embodiment comprises: providing a multi-wire bus having N wires arranged in pairs of wires, N being an integer greater than 2 and being a multiple of two; receiving, by an orthogonal differential vector signalling encoder, a set of input bits and responsively generating a set of symbols of a codeword of a vector signalling code, the codeword corresponding to a weighted summation of a plurality of sub-channel vectors that correspond to rows of a transmitter encoding matrix, the plurality of sub-channel vectors comprising at least one cross-pair sub-channel vector having same-signed vector components carried by at least one of the pairs of wires; and transmitting, by a set of drivers, each symbol of the codeword over a respective wire of the multi-wire bus by driving the respective wire with a wire signal level, wherein for a given symbol of the vector signalling code, each driver of the set of drivers drives the wire signal level of the respective wire responsive to modulations of the at least one cross-pair sub-channel vector by a first amount more than modulations of at least one other sub-channel vector.

BRIEF DESCRIPTION OF FIGURES

FIGS. 10 through 12 show illustrations of ODVS-based codebooks, according to an embodiment.

DETAILED DESCRIPTION

In this disclosure at times reference is made to elements of encoding matrices. The particular numerical values shown for each element, their sign, and their ordering when in matrix form (e.g. row and/or column order), are intended to be purely illustrative of the principles of this disclosure and should not be construed as limiting. It will be appreciated that permutations of the encoding matrix, including changing the order of rows and/or columns, and/or inverting the sign of each element in the encoding matrix, are within the scope of this disclosure.

Figure 1:
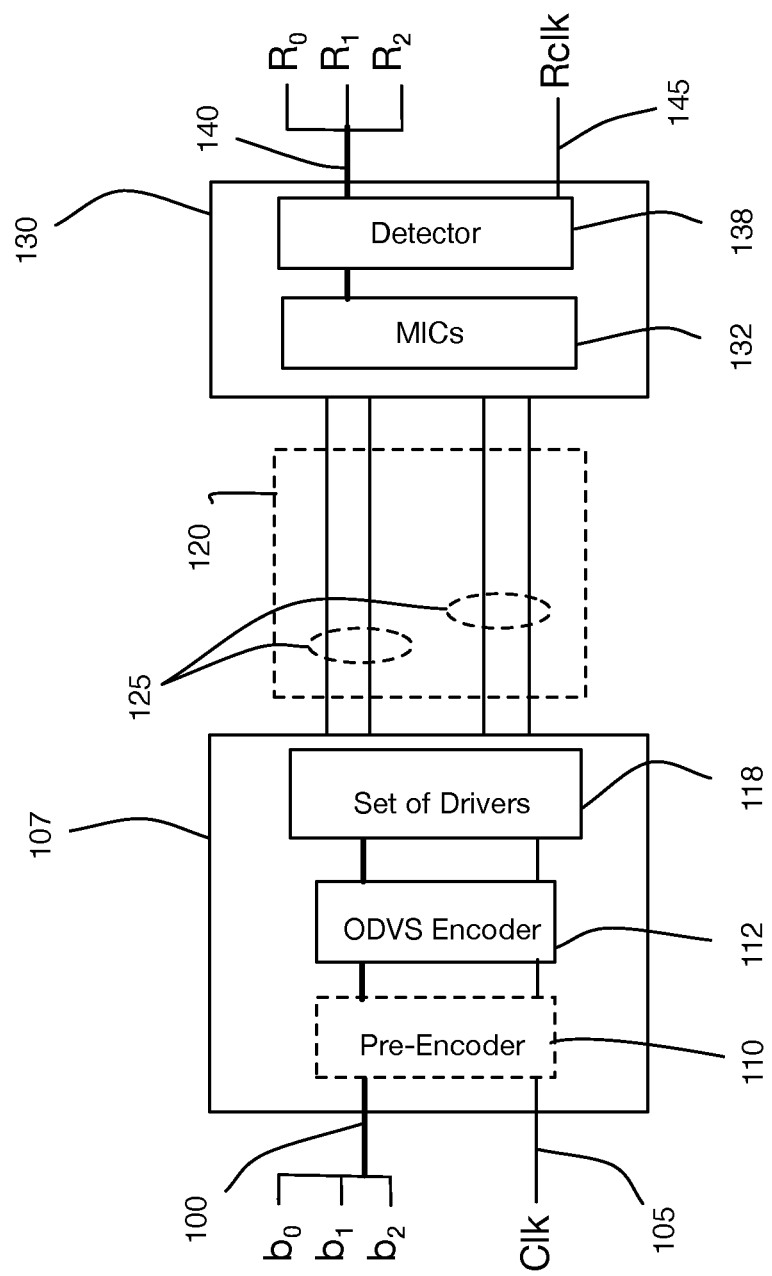
FIG. 1 is a block diagram of a communication system according to an embodiment.

A high-level block diagram showing a communication system capable of implementing pre-scaled ODVS according to an embodiment is shown in FIG. 1. The communication system includes a multi-wire bus that accepts a set of input bits, in this example $\{b_0, b_1, b_2\}$, via input wire 100 and sends these input bits to an ODVS encoder 112. ODVS encoder 112 generates an ODVS codeword based on the set of input bits and transmits the codeword, or instructions (i.e., data control signals) for generating wire signal levels corresponding to the codeword, to set of drivers 118. The codeword comprises a number of symbols equal to the number of wires 120, as one symbol of the codeword is transmitted over each wire per unit interval.

The encoding scheme employed by ODVS encoder 112 is based on a transmitter encoding matrix. In the case of FIG. 1, the transmitter encoding matrix is a Hadamard matrix of size equal to the number of wires. Rows of the Hadamard matrix are mutually orthogonal and this property is used to enable the information contained in each bit or data symbol to be transmitted as a superposition of wire signal levels over every wire of the multi-wire bus simultaneously. That is, each wire of the multi-wire bus simultaneously carries a component of every data symbol that is to be transmitted in a particular unit interval. Later in this disclosure, ODVS encoding schemes based on non-Hadamard encoding matrices are discussed.

A Hadamard matrix of size 4 is shown directly below. This forms the basis of the encoding scheme used in the setup shown in FIG. 1 having 4 wires. It will be appreciated that a larger Hadamard matrix can be used in cases where there are more wires, e.g. a Hadamard matrix of size 8 would be used in the case of 8 wires.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Each row of the Hadamard matrix is interchangeably referred to as a sub-channel, or equivalently a sub-channel vector, in this disclosure. The top row, known as the common mode sub-channel, contains only positive entries and in many embodiments is not used by ODVS encoder 112. This is represented mathematically below by including a zero value in the data vector. It will be appreciated that in a practical implementation, ODVS encoder 112 is configured to not use the common mode sub-channel for encoding—i.e. it is not necessary to generate a zero-valued placeholder as is shown below.

$$(w_0 \ w_1 \ w_2 \ w_3) = (0 \ b_0 \ b_1 \ b_2) \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad [1]$$

Here, $w_n$ represents the wire signal level on wire n and $b_m$ is the m-th bit for encoding. In this case the wires are assumed to be arranged such that wires 0 and 1 are a first pair and wires 2 and 3 are in a second pair (see also FIGS. 2A and 2B), although it will be appreciated that the wires can be grouped differently. Similarly, the ordering of the rows and/or columns of the Hadamard encoding matrix and/or the signs of the elements of the matrix can be switched without departing from the scope of this disclosure.

Wires 120 can be of various forms. Examples include traces on a substrate, interposer, or printed circuit board, or wires in an electrical cable—see FIGS. 2A and 2B respectively. Other forms for wires 120 can alternatively be used.

Drivers 118 are configured to transmit each symbol of the codeword over a respective wire of the multi-wire bus by driving the respective wire with a wire signal level. The wire signal level can correspond to a voltage level, for example. For convenience the wire signal levels are often represented by signed numbers that indicate a relative level. For example, a codeword can be represented as $\{+1/3, +1/3, +1/3, -1/2\}$ to indicate that wires $w_0$, $w_1$ and $w_2$ are all driven at a given wire signal level corresponding to +1/3 (e.g. 350 mV), whilst wire $w_3$ is driven at a different magnitude and with opposite polarity to the other wires. This voltage would be −525 mV in this particular example, corresponding to −1/2. In another example of ODVS codewords being mapped to specific wire voltages, a maximum level may be represented as 800 mV (+1/2 symbol), and low is 100 mV (−1/2 symbol), with 680 mV for +1/3 symbol, and 220 mV for −1/3 symbol. Other mappings (voltage offsets and scalings) to obtain actual wire voltage levels may also be used. (Note—in this disclosure, codewords are expressed in a nomenclature in which wire signal levels are listed in ascending wire order, e.g. for a 4-wire bus a codeword is expressed as $\{w_0, w_1, w_2, w_3\}$).

In the illustrated embodiment the set of input bits comprises three input data symbols in the form of binary bits $\{b_0, b_1, b_2\}$ for transmission over four wires 120 arranged in two pairs 125. It will be appreciated that this arrangement is purely exemplary and that the number of bits represented by each data symbol and number of wires (i.e., the length of the codewords) can be varied from that shown. For example, another embodiment contemplates transmission of 7 data symbols over 8 wires. In general, in the case of Hadamard matrix-based ODVS encoding, N wires are present for transmitting N−1 data symbols (e.g., binary data bits or higher modulus data symbols), N being an integer greater than 2 and being a power of two. The N wires are arranged in N/2 pairs, with two wires in each pair, e.g. pairs 125 as shown in FIG. 1. This could correspond to wires $w_0$ and $w_1$ being one pair and wires $w_2$ and $w_3$ being another pair, for example.

Transmitter 107 includes a pre-encoder 110 as shown in FIG. 1, although this can be omitted if pre-encoding is not required. If present, pre-encoder 110 can apply an additional type of encoding supplementing the ODVS encoding applied by ODVS encoder 112. The encoding applied by pre-encoder 110 is referred to herein as a pre-code for clarity. The pre-code could be any of the following encoding techniques: an error-correction code, a dicode, and a Class 2 code. The pre-coder may also implement PAM-X (where "X" is an integer) encoding to map data bits to data symbols, such as PAM-3 encoding that maps three data bits to two PAM-3 "trits", or perhaps maps 11 data bits to a sequence of 7 trits. Similarly, two data bits may be mapped to a single PAM-4 signal level. Combinations of these techniques are also contemplated, i.e. pre-encoder 110 could use make use of any combination of these techniques. Other encoding techniques not expressly listed here can also, or alternatively, be applied by pre-encoder 110.

While pre-encoder 110 is shown in FIG. 1 as preceding ODVS encoder 112, it will be appreciated that in some embodiments the ordering of these two components can be switched, i.e. ODVS encoder 112 can instead precede pre-encoder 110. This switching of the ordering of encoding is possible because the ODVS encoding scheme is a linear encoding scheme.

A further possible implementation has pre-encoder 110 combined into one block with ODVS encoder 112.

One implementation of said combined block is with a look-up table.

Transmitter 107 is clocked by a clock signal Clk 105. Clock signal 105 can be generated by any means know in the art. Transmitter 107 preferably has a single clock domain as shown in FIG. 1, such that ODVS encoder 112, drivers 118 and pre-encoder 110 (if present) are all triggered based on Clk 105. This is however not strictly necessary as the techniques disclosed herein can also function in the case where transmitter 107 has multiple clock domains.

One implementation of transmitter 107 is a purely analog unclocked block.

One implementation of said analog unclocked block is where the OVDS encoder 112 is constructed with resistors.

Transmitter 107 is coupled to a receiver 130 at the opposite end of wires 120 to transmitter 107. Receiver 130 is configured to receive the signals transmitted over wires 120, identify the codeword of the ODVS code that the received signals represent and decode this codeword to recover the input bits that were originally provided to transmitter 107.

Receiver 130 includes a set of multi-input comparators ('MICS') 132 to assist in the decoding process. One MIC is described below, on the understanding that each of the set of MICs is of the same construction.

The MIC takes inputs from all wires (4 in the illustrated case). N/2 of the wires are received at respective positive (non-inverting) inputs of the MIC and the other N/2 of the wires are received at respective negative (inverting) inputs of the MIC. The MIC sums over all the inputs and outputs the result of this summation. The inverting and non-inverting inputs mean that the output of the MIC is equivalent to a sum over N/2 of the wires subtracted from a sum over the other N/2 wires.

Each MIC in the set of MICs is coupled to wires 120 in a different configuration meaning that each MIC performs a different summation of the wire signal levels. The specific coupling order of each wire to each MIC are determined using the pre-scaled ODVS encoding scheme as discussed later.

The output of each MIC is provided to detector 138 that is configured to map the MIC outputs to bit values. These bit values are then output over wire 140—see recovered bits $\{R_0, R_1, R_2\}$ in FIG. 1. Although three recovered bits are shown in FIG. 1, it will be appreciated that in the general case of N wires, N−1 bits will be recovered (by, e.g., slicing the PAM-2 data symbols) by receiver 130 per unit interval. For codes that encode additional bits, a multi-level signal may be recovered.

Receiver 130 is clocked by receiver clock Rclk 145. Preferably Rclk 145 has the same frequency as the transmitter clock Clk 150, and more preferably is synchronised with Clk 150.

Receiver 130 can include an equalizer (not shown) that would typically be located such that it performs equalization on the signals from wires 120 before they are received by MICs 132. The equalizer could be a continuous time linear equalizer (CTLE), for example. The equalizer is configured to undo as far as possible any undesirable transformations to the signals that occurred as they propagated over wires $w_0$ to $w_3$. For example, higher frequency components of the signals tend to be more heavily attenuated than lower frequency and so the equalizer can be configured to boost higher frequency components to undo this effect to some degree at least.

Receiver 130 can also include an equalizer (not shown) that would typically be located such that it performs equalization on the outputs of MICs 132. These equalizers can be of any of the typical forms of equalization including Continuous Time Linear Equalizers (CTLE)s, Decision Feedback Equalizers (DFE)s, or Feed Forward Equalizers (FFE)s.

Figure 2A:
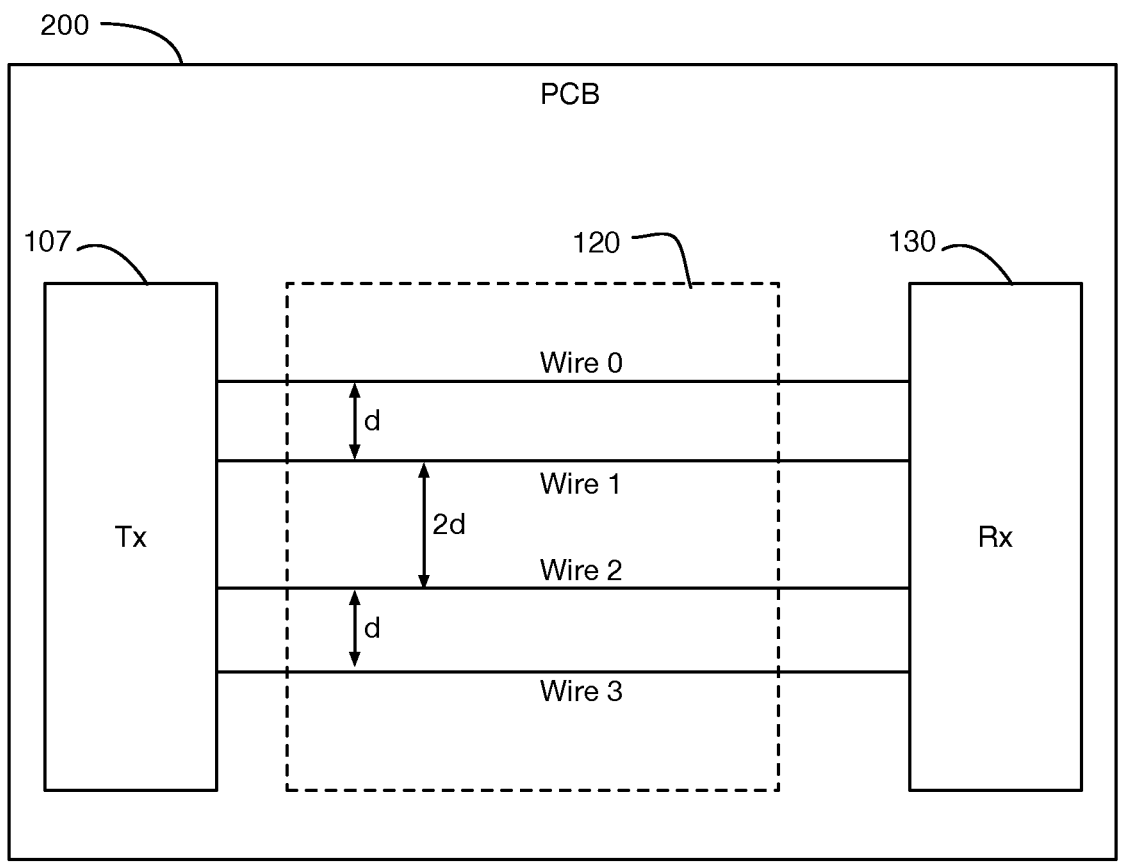
FIG. 2A is a schematic diagram of a printed circuit board showing a physical arrangement of wires that is suitable for implementing embodiments.
Figure 2B:
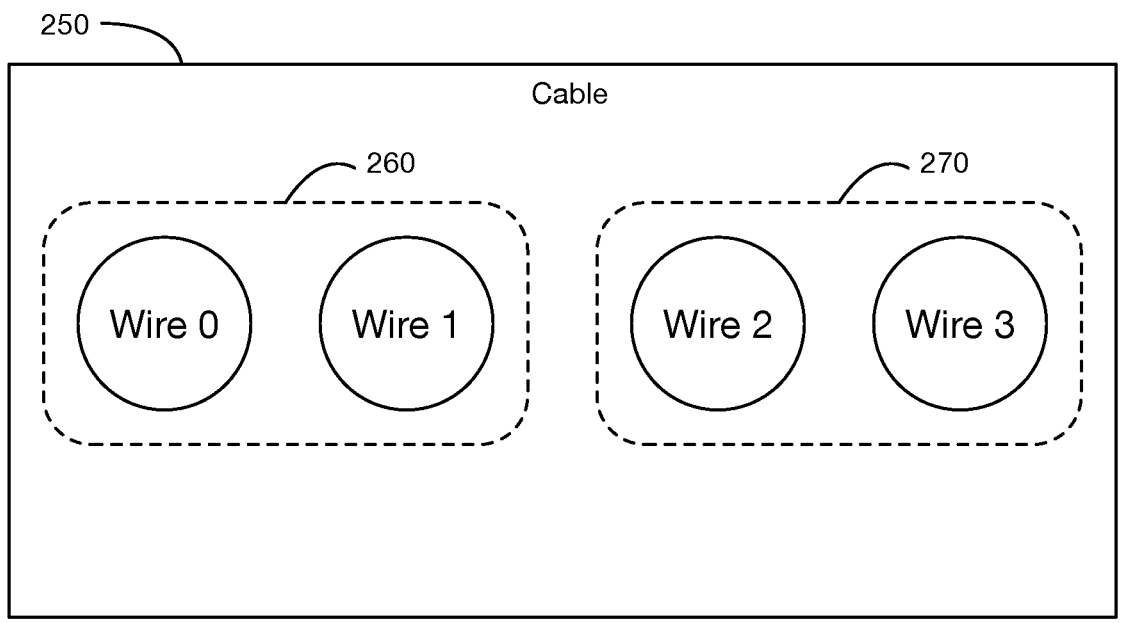
FIG. 2B is a schematic diagram of a cable showing a physical arrangement of wires that is suitable for implementing embodiments.

Referring now to FIGS. 2A and 2B, some exemplary signal conductor environments for wires 120 are shown. FIG. 2A shows a printed circuit board (PCB) signal conductor environment 200 on which transmitter 107, wires 120 and receiver 130 are mounted. Wires 120 take the form of traces on the PCB and are arranged in pairs as shown—wires 0 and 1 forming one pair and wires 2 and 3 forming another pair. The distance between wires within a pair is d. The distance between the pairs is 2d. d could be equal to 5 mm, for example. This arrangement is purely exemplary and modifications from this are contemplated, e.g. the spacing between pairs of wires could be some other multiple of the spacing between wires within a pair, including non-integral multiples. Although four wires are shown, it will be appreciated that these principles can be applied to arrangements having more than 4 wires, e.g. a 6-wire bus with 3 pairs of wires, an 8-wire bus with 4 pairs of wires, and in the general case an N-wire bus with N/2 pairs of wires.

FIG. 2B shows another arrangement in which wires 120 are secured within a cable signal conductor environment 250. The cable has an outer jacket that surrounds all of the wires. Transmitter 107 and receiver 130 are coupled to respective ends of cable 250. Within the cable, the wires are arranged in pairs with each pair being surrounded by its own shield. As shown, wires 0 and 1 are shielded by shield 260 and wires 2 and 3 are shielded by shield 270. Each shield serves to reduce the level of electromagnetic interference experienced by the pair of wires it surrounds and is constructed of a material that has appreciable EMI shielding properties, e.g. a metal mesh (sometimes referred to as a 'Faraday cage'). Within cable 250, the spacing between pairs of wires may be the same as the spacing within each pair of wires, or different as illustrated in FIG. 2A. This arrangement can be generalised to the N-wire case with N/2 shielded pairs of wires. The typical name for this sort of cable is Twin-ax cable.

However the wires are arranged, the pair-wise arrangement of wires has a bearing on the signal to noise ratio of each sub-channel. As can be seen from equation [1], the sub-channels corresponding to rows 2 and 4 that encode bits $b_0$ and $b_2$ respectively are balanced in the sense that each pair of wires carries a component corresponding to both a positive and negative element of the transmitter encoding matrix (in this case a Hadamard matrix). However, the sub-channel corresponding to the third row of the Hadamard matrix (as it is shown in equation [1]) that encodes bit $b_1$ is not balanced in this way. Instead, the wire pair formed of wires 0 and 1 carries two positively signed components and the wire pair formed of wires 2 and 3 carries two negatively signed components. 'Unbalanced' sub-channels of this type are referred to as the 'cross-pair sub-channels' in this disclosure.

The lack of balance in the cross-pair sub-channel means that it exhibits inferior signal transport properties relative to the other non-cross-pair sub-channels. Specifically, the cross-pair sub-channel can experience additional loss compared with the other sub-channels. Furthermore, the cross-pair sub-channel can also have a different propagation speed compared with the other sub-channels. This is because the energy for the cross-pair sub-channels propagates in two 'wire vs. shield' modes instead of two 'wire versus wire' modes. These factors can lead to a reduced signal to noise ratio for bits encoded using the cross-pair sub-channel which can translate to a higher bit error ratio (BER). This is undesirable.

ODVS encoder 112 is configured to at least partially mitigate the additional loss experienced by the cross-pair sub-channel. This is achieved by modifying the Hadamard matrix above to include a pre-scaler PS for each sub-channel. The modified Hadamard matrix is shown directly below as equation [2]:

$$(w_0 \; w_1 \; w_2 \; w_3) = \qquad [2]$$
$$(0 \; b_0 \; b_1 \; b_2) \begin{bmatrix} 1 & 1 & 1 & 1 \\ PS_0 & -PS_0 & PS_0 & -PS_0 \\ PS_1 & PS_1 & -PS_1 & -PS_1 \\ PS_2 & -PS_2 & -PS_2 & PS_2 \end{bmatrix}$$

Note that it is assumed that the physical arrangement of the wires mirrors that of the ordering of the vector on the left-hand side of equation [2]—i.e. wires 0 and 1 are arranged as a first pair and wires 2 and 3 are arranged as a second pair.

Here, the pre-scaler for the nth sub-channel is $PS_n$. Each sub-channel can have a different pre-scaler value, where each pre-scaler is a number greater than zero. The pre-scaler for the cross-pair sub-channel, $PS_1$, is greater than 1. This has the effect of boosting the cross-pair sub-channel relative to the other sub-channels, such that the aforementioned additional loss experienced by the cross-pair sub-channel is at least partially compensated for. This can result in an improved signal to noise ratio for the cross-pair sub-channel at the receiver and a reduced BER. It will be appreciated that the ordering of rows, columns and/or signs of the pre-scaled Hadamard matrix of equation [2] can be changed from that shown above without departing from the scope of this disclosure.

The following formula can be used to find the dB version of the boost/gain applied to a sub-channel n by the pre-scaler:

$$\text{Gain (dB)} = 20 \; \log_{10}(PS_n) \qquad [3]$$

As will be appreciated, in the case where $PS_n < 1$, the logarithmic function becomes negative and hence the corresponding sub-channel is attenuated rather than amplified. This is desirable in some circumstances as detailed below.

The values of $PS_2$ and $PS_0$ are selected based on the following considerations. Firstly, to support typical pair-oriented channels, it is possible to set $PS_0 = PS_2$. This has the advantage of reducing the size of the alphabet of the ODVS codebook for encoder 112, with the possibility of a corresponding reduction in the complexity of drivers 118. For example, in the illustrated embodiment with 3 bits over 4 wires, the alphabet is of size 6 in the case where $PS_0 = PS_2$ but of size 8 in the case where $PS_0 \neq PS_2$.

The typical implementation is constrained by a set maximum signal swing whose properties are unrelated to the pre-scaler. In order to allow the pre-scaler to be used while still honoring that maximum signal swing, the following relationship can be used.

$$PS_0 + PS_1 + PS_2 = C \qquad [4]$$

Here, C is a constant that takes a positive value that is dependent on the components of the encoding matrix [2]. In one particular case each component of encoding matrix [2] is scaled by a factor of 1/3, giving C a value of 3.

This keeps the maximum signal swing constant and can be thought of conceptually as redistributing power to the cross-pair sub-channel(s) from the other sub-channels. This is however not strictly necessary and pre-scaler values that cause variations in the maximum signal swing from a non-pre-scaled configuration are also possible. In this case, the maximum signal swing would be correspondingly adjusted in another block within the transmitter.

It will be appreciated that this relationship holds for the 4 wire/3 sub-channel case and that it can be generalised to the N wire case for Hadamard matrix based encoding schemes by considering that the maximum signal swing is kept invariant by requiring that the sum of all the pre-scaler values is equal to a constant, i.e.

$$\sum_{i}^{k-1} PS_i = C$$

for k sub-channels carried over k+1 wires, where i=0 to k−1. The ability to maintain the maximum signal swing constant means that the pre-scaler can be used without necessitating changes to an existing bus design to account for different maximal signal swing.

It will be appreciated that maintaining the maximum signal swing constant requires a value for the non-cross-pair sub-channels, i.e. $PS_2$ and $PS_0$ in the 4 wire case, that is less than 1. This means that the non-cross-pair sub-channels are attenuated relative to the non-pre-scaled versions as according to equation [1]. While this decreases the signal to noise ratio of these sub-channels, the decrease tends to be outweighed by the increase in signal to noise ratio of the cross-pair sub-channel such that the overall signal to noise ratio across all sub-channels is improved.

Some exemplary values for the 3 sub-channel/4 wire case are shown in Table 1 below, with the condition that $PS_0=PS_2$. These values are based on equation [3]. As can be seen, the larger the value of $PS_1$, the greater the gain to the cross-pair sub-channel and the greater the attenuation of the other sub-channels.

TABLE 1

| $PS_1$ | $PS_0$ | $PS_2$ | $PS_1$ Gain (dB) | $PS_0$ and $PS_2$ Gain (dB) |
|---|---|---|---|---|
| 1.1 | 0.95 | 0.95 | 0.828 | −0.446 |
| 1.2 | 0.9 | 0.9 | 1.584 | −0.915 |
| 1.3 | 0.85 | 0.85 | 2.279 | −1.412 |
| 1.4 | 0.8 | 0.8 | 2.923 | −1.938 |
| 1.5 | 0.75 | 0.75 | 3.522 | −2.499 |
| 1.6 | 0.7 | 0.7 | 4.082 | −3.098 |
| 1.7 | 0.65 | 0.65 | 4.609 | −3.742 |
| 1.8 | 0.6 | 0.6 | 5.105 | −4.437 |
| 1.9 | 0.55 | 0.55 | 5.575 | −5.193 |
| 2 | 0.5 | 0.5 | 6.021 | −6.021 |

It is also possible to have a situation in which all the pre-scaler values are different. This may or may not preserve the maximum signal swing relative to the non-pre-scaled case, as desired. For example, a detailed analysis of the losses of each sub-channel can be performed, either by experiment or simulation, to identify possible discrepancies between the non-cross-pair sub-channels in the example above. The values of $PS_0$ and $PS_2$ could then be selected to counteract these discrepancies—e.g. if it were discovered that the sub-channel pre-scaled by $PS_0$ was more lossy than the sub-channel pre-scaled by $PS_2$, $PS_0$ could be set at a greater value than $PS_2$ to at least partially address this imbalance.

Table 2 below shows a possible set of wire signal levels for the 4-wire case where $PS_0$ and $PS_2$ are both set to the same value that is less than 1 and where $PS_1$ is greater than 1, i.e. a 6 symbol alphabet. This example maps a bit value of 1 to +1/2 and a bit value of 0 to −1/2 for scaling reasons. This is not essential and other bit mappings can be used instead. Also shown is the size of the eye for each sub-channel relative to a differential non-return to zero arrangement (i.e. two bits transmitted over two differential pairs of wires, one bit per pair). Each wire signal level given in this table is a representative value that maps to an actual voltage, e.g. 1/2 maps to 600 mV, 1/5 maps to 240 mV, etc. All of these values are purely exemplary and are provided to aid in the understanding of the invention. Accordingly, these values should not be construed as limiting. Eye 0 corresponds to the sub-channel carrying the information representing bit $b_0$, Eye1 corresponds to the cross-pair sub-channel carrying the information representing bit $b_1$ and Eye2 corresponds to the sub-channel carrying the information representing bit $b_2$.

TABLE 2

| Input data {b2, b1, b0} | Wire 0 | Wire 1 | Wire 2 | Wire 3 | Eye 0 | Eye 1 | Eye 2 |
|---|---|---|---|---|---|---|---|
| 000 | −1/2 | +1/10 | +1/5 | +1/5 | −3/5 | −4/5 | −3/5 |
| 001 | −1/5 | −1/5 | +1/2 | −1/10 | −3/5 | −4/5 | +3/5 |
| 010 | −1/10 | +1/2 | −1/5 | −1/5 | −3/5 | +4/5 | −3/5 |
| 011 | +1/5 | +1/5 | +1/10 | −1/2 | −3/5 | +4/5 | +3/5 |
| 100 | −1/5 | −1/5 | −1/10 | +1/2 | +3/5 | −4/5 | −3/5 |
| 101 | +1/10 | −1/2 | +1/5 | +1/5 | +3/5 | −4/5 | +3/5 |
| 110 | +1/5 | +1/5 | −1/2 | +1/10 | +3/5 | +4/5 | −3/5 |
| 111 | +1/2 | −1/10 | −1/5 | −1/5 | +3/5 | +4/5 | +3/5 |

As can be seen, for every combination of input bits, Eye1 is larger compared to the eyes of the other two non-cross-pair sub-channels. This illustrates the boost that the pre-scaler provides to the cross-pair sub-channel. It is important to appreciate that this boost is not being applied to one particular wire because each wire carries a component of the cross-pair wire signal level. Instead, the boost is being applied to the cross-pair sub-channel—this can be understood as boosting a component of each wire signal level, where this component corresponds to the cross-pair sub-channel.

Configurations in which the pre-scaler is dynamic are also contemplated. That is, the value of the pre-scaler applied to each sub-channel can be adjustable during use. The adjustment can be performed during a startup procedure, whilst the system is in use, or both, for example. The pre-scaler could be selected based on a signal conductor environment of wires 120. Here, the term 'signal conductor environment' refers to parameters of wires 120 that affect the propagation of signals along them. The dimensions of wires 120 are one such parameter (length, width, cross-sectional area, etc.) Another parameter is the material that each wire is made from. A further parameter is the physical layout of wires 120—e.g. the distance between adjacent wires, the distance between adjacent pairs of wires, etc. Whether any wire shielding is in use is yet another parameter that contributes to the signal conductor environment.

Typically the signal conductor environment is linked to the physical carrier used for the wires as this has a bearing on many if not all of the parameters mentioned immediately above. For example, in the case where the physical carrier is a printed circuit board (PCB), wires 120 are circuit traces (FIG. 2A). In this case, a first set of pre-scalers that are optimised for PCB traces can be selected. In another case where wires 120 are part of an electrical cable (FIG. 2B), a second set of pre-scalers that are optimised for electrical cables can be selected. See FIG. 4 and related description for further discussion.

It will be appreciated that the complexity of the set of drivers 118 increases with the number of allowed pre-scaler values. This is because supporting each pre-scaler value requires drivers 118 to be configurable to generate additional wire signal levels. In general, where dynamic pre-scaling is used, there will be a particular number of pre-scaler settings that provides a good balance between signal to noise optimisation and driver complexity. For example, it is contemplated that supporting two or three of the sets of pre-scaler values of Table 1 would represent a good balance between BER reduction and driver complexity for some situations.

The discussion above focusses on the 3 sub-channel/4 wire case in which there is just one cross-pair sub-channel. It should be appreciated, however, that cases with more wires have more than one cross-pair sub-channel. The 8-wire case is shown below to illustrate this. As in the 4-wire case, the common-mode row of the size 8 Hadamard matrix is unused:

$$w = b \begin{bmatrix} 1 & 1 & 1 & 1 & 1 & 1 & 1 & 1 \\ PS_0 & -PS_0 & PS_0 & -PS_0 & PS_0 & -PS_0 & PS_0 & -PS_0 \\ PS_1 & PS_1 & -PS_1 & -PS_1 & PS_1 & PS_1 & -PS_1 & -PS_1 \\ PS_2 & -PS_2 & -PS_2 & PS_2 & PS_2 & -PS_2 & -PS_2 & PS_2 \\ PS_3 & PS_3 & PS_3 & PS_3 & -PS_3 & -PS_3 & -PS_3 & -PS_3 \\ PS_4 & -PS_4 & PS_4 & -PS_4 & -PS_4 & PS_4 & -PS_4 & PS_4 \\ PS_5 & PS_5 & -PS_5 & -PS_5 & -PS_5 & -PS_5 & PS_5 & PS_5 \\ PS_6 & -PS_6 & -PS_6 & PS_6 & -PS_6 & PS_6 & PS_6 & -PS_6 \end{bmatrix} \quad [5]$$

where $w = (w_0\ w_1\ w_2\ w_3\ w_4\ w_5\ w_6\ w_7)$ and $b = (0\ b_0\ b_1\ b_2\ b_3\ b_4\ b_5\ b_6)$.

In the 8-wire case, there are three cross-pair sub-channels. These are rows 3, 5 and 7 in equation [5]. It can be seen that in each of those rows, pairs of wires are assigned Hadamard matrix elements having the same sign. (Note that it is assumed that the wires are physically arranged in pairs in the order shown in the vector on the left-hand side of equation [5]—i.e. wires 0 and 1 form a first pair, wires 2 and 3 form a second pair, etc.) $PS_1$, $PS_3$ and $PS_5$ can therefore be set to values greater than 1 to boost these cross-pair sub-channels. In the most straight-forward case $PS_1 = PS_3 = PS_5$. However, variations from this are possible as each cross-pair sub-channel can be boosted by a different amount.

In the most straight-forward case $PS_0 = PS_2 = PS_4 = PS_6$. However, variations from this are possible as each non-cross-pair sub-channel can be attenuated by a different amount. Referring to the discussion above, in the 8-wire case the maximum signal swing remains constant as long as the sum of all of the pre-scalers equals a constant. As noted above, it is not strictly necessary to keep the maximum signal swing constant and pre-scaler values that cause variations in the maximum signal swing from a non-pre-scaled configuration are also possible. In this case, the maximum signal swing would be correspondingly adjusted in another block within the transmitter.

As in the 4-wire case, the typical implementation is constrained by a set maximum signal swing whose properties are unrelated to the pre-scaler. In order to allow the pre-scaler to be used while still honoring that maximum signal swing, the following relationship can be used.

$$PS_0 + PS_1 + PS_2 + PS_3 + PS_4 + PS_5 + PS_6 = C \quad [6]$$

Here, C is a constant that takes a positive value that is dependent on the components of the encoding matrix [5]. In one particular case each component of encoding matrix [5] is scaled by a factor of 1/7, giving C a value of 7.

This keeps the maximum signal swing constant and can be thought of conceptually as redistributing power to the cross-pair sub-channel(s) from the other sub-channels. This is however not strictly necessary and pre-scaler values that cause variations in the maximum signal swing from a non-pre-scaled configuration are also possible. In this case, the maximum signal swing would be correspondingly adjusted in another block within the transmitter.

The principles established above can be generalised to the N-wire case. Specifically, all pre-scalers corresponding to cross-pair sub-channels are set to a value greater than 1 and all other pre-scalers are either set to a value of 1 where keeping the maximum signal swing constant is not a concern or set to a value less than 1 where this is a concern.

Having discussed Hadamard-matrix based pre-scaled ODVS encoding above, the discussion now turns to decoding pre-scaled Hadamard-matrix based ODVS codewords at a receiver. In the 4-wire/3 sub-channel case, decoding of the codeword by receiver 130 to recover the input bits can be performed using the following equation in which the common mode sub-channel is not used and has therefore been removed from the receiver matrix. R represents a bit recovered by the receiver, and so in the case of no errors, $R_i = b_i$.

$$(R_0\ R_1\ R_2) = (w_0\ w_1\ w_2\ w_3) \begin{bmatrix} 1 & 1 & 1 \\ -1 & 1 & -1 \\ 1 & -1 & -1 \\ -1 & -1 & 1 \end{bmatrix} \quad [7]$$

This equation is based on the fact that the product of a Hadamard matrix and its transpose is the identity matrix, i.e. the transpose of a Hadamard matrix is its inverse. The codeword received over the wires can thus be multiplied by the transpose of the Hadamard matrix used to perform the encoding to recover the original input bits. Note that the pre-scalers are not present in the decoding matrix—this is because the boost has already been applied by the time the decoding is performed by receiver 130.

Equation [7] can be generalised to the N-wire case as follows: $R = w \cdot H^T$. Here, R is a bit vector of size N−1 containing the recovered bits, w is a wire vector of size N containing the received wire signal levels/symbols (collectively a codeword) and $H^T$ is the transpose of the Hadamard matrix that was used to encode the bits excluding the common mode sub-channel that was not used by the transmitter to carry any data. $H^T$ is thus of size N×N−1.

Figure 3:
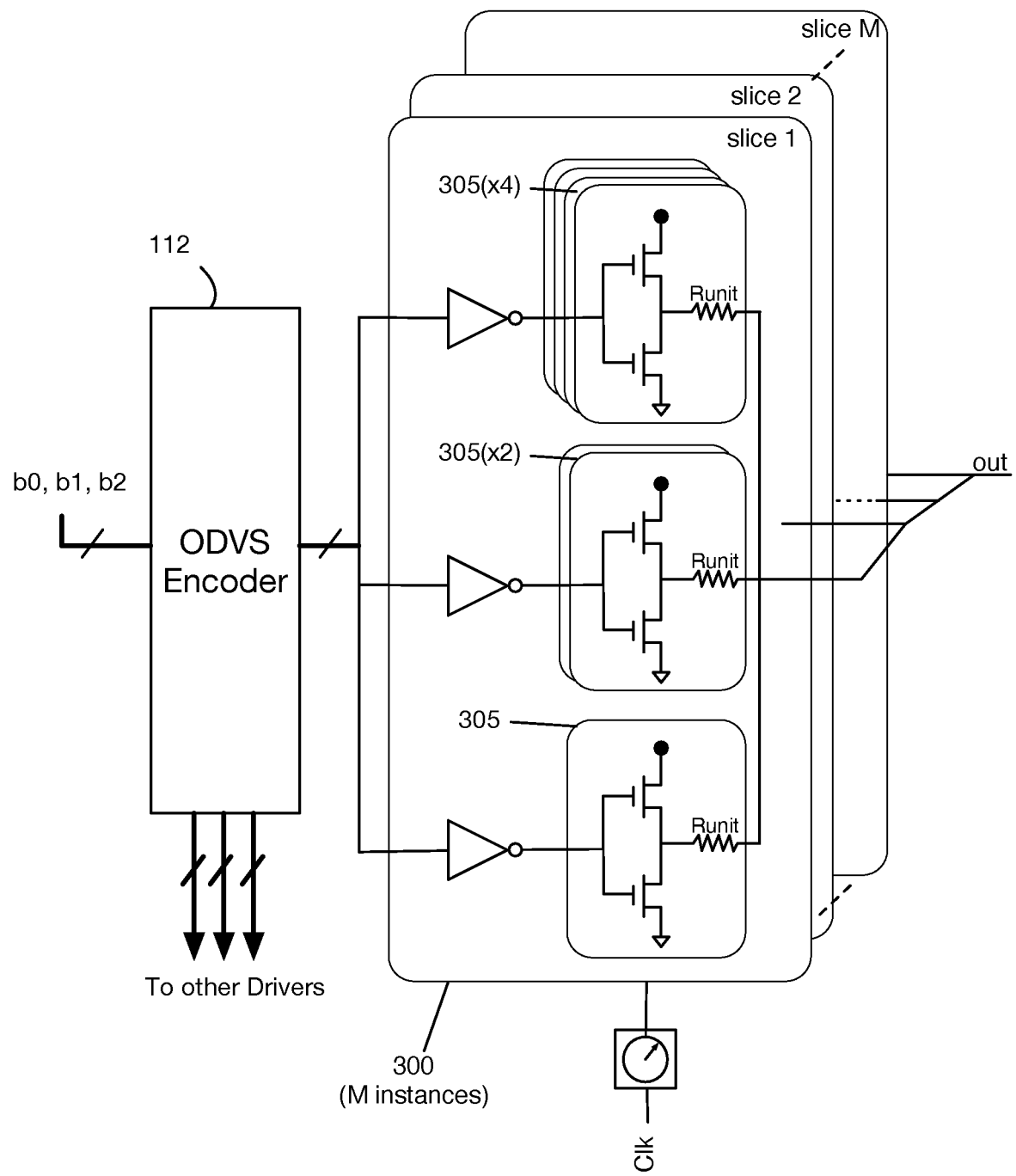
FIG. 3 is a block diagram of an encoder and set of drivers that perform pre-scaled ODVS, according to an embodiment.

Having discussed the principles of Hadamard-matrix based pre-scaled ODVS encoding and decoding, the disclosure now moves on to circuitry capable of performing these tasks. FIG. 3 shows one way in which set of drivers 118 that are part of transmitter 107 can be configured to apply the pre-scaler to each sub-channel in the 4 wire/3 sub-channel case. Each driver of the set 118 takes the form of an M-slice driver, with each slice being identical to the others. This is not essential as the drivers 118 could instead be of a single-slice construction. However, the multi-slice construction can offer advantages in terms of impedance matching with other elements of the system such as wires.

Slice 300 is shown for the purposes of illustration. Each of the M slices is coupled in parallel to one of the wires of the multi-wire bus. It will thus be appreciated that in the 4-wire case the driver arrangement shown is repeated three additional times, with each repetition connected to a different one of the 4 wires. The set of drivers 118 are clocked by clk 105 as discussed earlier and as shown in FIG. 3.

Each slice 300 includes a plurality of driver elements 305 that are grouped in parallel a binary fashion. Specifically, each group of driver elements is enabled or disabled based on a corresponding control bit output from ODVS encoder 112. Alternative embodiments might utilize a thermometer-coded approach. The driver of FIG. 3 utilizes the slice-wise architecture described in [Ulrich], however other driver designs may be used instead. The number of slices arranged in parallel collectively determines the output impedance of the driver, and such output impedance may be configurable depending on the number of enabled slices. In this way, selective activation of the driver element groups can adjust the voltage at the output of slice 300 in a controlled manner to generate a certain wire signal level. [Ulrich] goes into additional detail of various configurability options for the multi-slice driver of FIG. 3 including impedance matching, skew correction, and transmit-side equalization.

The number of driver elements is selected based on the required ODVS alphabet. In the illustrated case the alphabet is either 6 symbols or 8 symbols depending on whether $PS_0=PS_2$ (6 symbol alphabet) or $PS_0 \neq PS_2$ (8 symbol alphabet). The driver of FIG. 3 has a group having a single push-pull amplifier, a group having 2 push-pull amplifiers arranged in parallel and a group having 4 push-pull amplifiers arranged in parallel. The driver thus generates eight possible wire signal levels in total, enough for both the $PS_0=PS_2$ and $PS_0 \neq PS_2$ cases. (It will be appreciated that two wire signal levels are unused in the $PS_0=PS_2$ case). In the case of a larger alphabet, further groups of push-pull amplifiers can be added—e.g. adding a group of 8 push-pull amplifiers arranged in parallel increases the total wire signal levels to 16, allowing an alphabet with up to 16 symbols to be handled. While it is not strictly necessary that driver is composed of groups of equal-sized driver elements, this is preferred as it simplifies other aspects of the design of the system. Alternative configurations in which the sizes of the driver elements are different are thus also contemplated.

In operation, ODVS encoder 112 receives a set of input bits, e.g. $\{b_0, b_1, b_2\}$, and responsively generates a respective set of control bits for driver 300 and the other non-illustrated drivers based on the received set of input bits. Each set of control bits corresponds to one of a set of pre-scaled ODVS symbols. Specifically, driver 300 receives control bits that cause it to generate a wire signal level that corresponds to the symbol of the codeword that is to be transmitted over the wire that driver 300 is coupled to. The non-illustrated drivers similarly each receive control bits to generate respective wire signal levels that correspond to the symbol of the codeword that is to be transmitted over the wires that the non-illustrated drivers are respectively coupled to.

The control bits cause driver 300 to activate driver element groups 305 in a manner that causes the wire signal level corresponding to the symbol to be generated. For example, assume that driver 300 is coupled to wire 1 and the input bits are $\{0, 0, 0\}$. In this case, referring to Table 2, the codeword for transmission in the relevant unit interval is $\{-1/2, 1/10, +1/5, +1/5\}$. The wire signal level for wire 1 is thus +1/10. ODVS encoder 112 generates control bits for driver 300 that causes it to activate driver element groups 305 so as to generate a wire signal level of +1/10. This may correspond to a voltage of 240 mV, for example. It will be appreciated that these values and codewords are purely exemplary and are in no way limiting on the scope of this disclosure.

Figure 4:
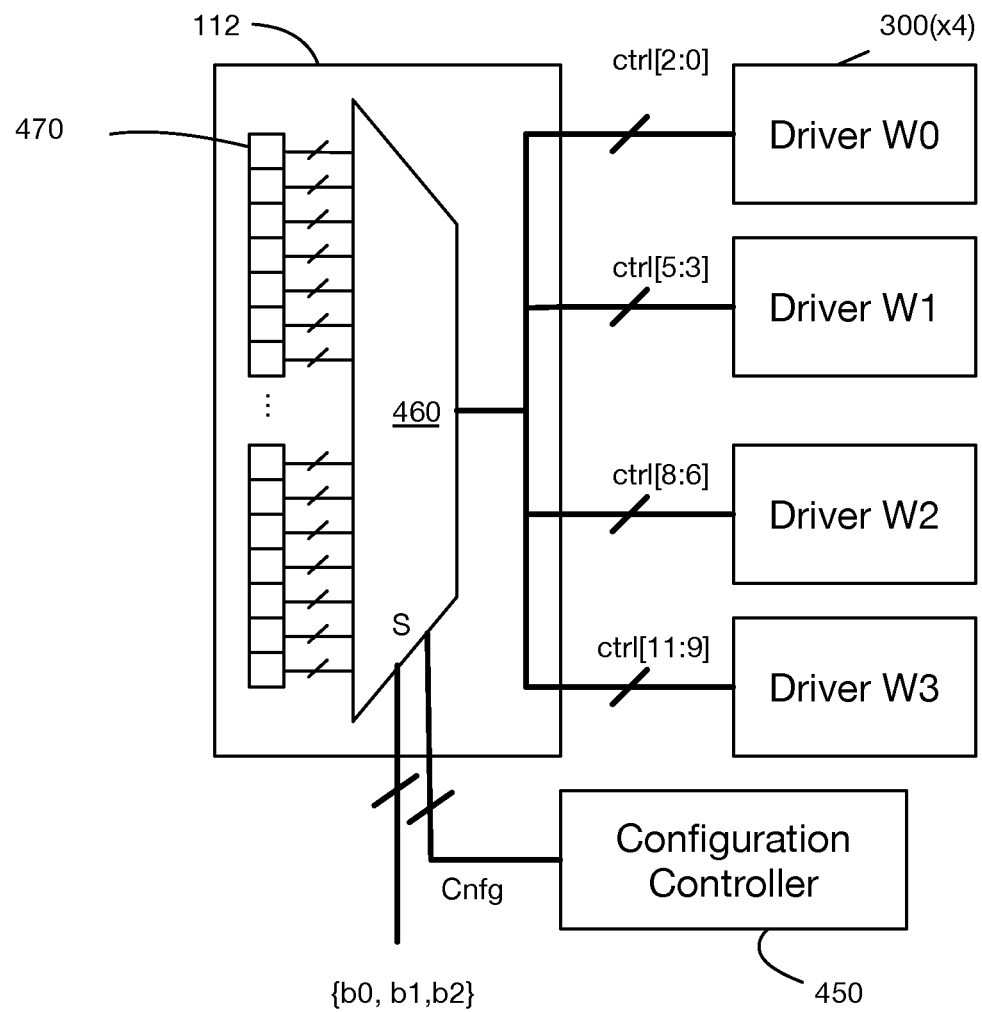
FIG. 4 is a block diagram of an encoder that dynamically selects one of a set of pre-scaler profiles for use in pre-scaled ODVS, according to an embodiment.

FIG. 4 shows in schematic form an ODVS encoder 112 that is implemented as a mapping encoder and which can be used to generate control bits for the drivers 300. A mapping encoder operates to provide a predictable and repeatable mapping of an input to an output. In this case the input is a set of input bits $\{b_0, b_1, b_2\}$ and one or more configuration bits $\{cnfg\}$, and the output is a respective set of control bits ctrl[11:0] for controlling the plurality of drivers 300 to transmit the necessary wire signal levels over wires 0 to 3. One such mapping encoder can be provided for each driver in the set, or one mapping encoder can provide sets of control bits sufficient to control all of the drivers in the set. As shown, each driver 300 receives a respective 3 of the 12 control bits.

The mapping encoder uses a lookup table to determine the appropriate set of control bits based on the input bits. The lookup table can be implemented purely as circuit components, e.g. a FPGA or a collection of logic gates. Alternatively a register or set of registers can be used to store the lookup table for use by the mapping encoder.

In FIG. 4, the encoder 112 utilizes a multiplexing circuit 460 having inputs connected to registers 470. Each driver 300 is configured to receive a respective set of three control bits, and each driver is configured to generate eight possible wire signal levels. Such a number should not be considered limiting. Continuing the example, each register 470 may store a total of 12 control bits, three bits for each of the four drivers. As shown in FIG. 4, the driver 300 connected to wire $w_0$ receives a first set of control bits ctrl[2:0], the driver 300 connected to wire $w_1$ receives a second set of control bits ctrl[5:3] and so on. The control bits in each register 470 are associated with a respective value of the input bits.

In at least one embodiment, the control bits are selected based only on the set of input bits. In the example of FIG. 4, there are eight possible values for the set of three input bits, and thus the multiplexer 460 may select one of eight registers 470 depending on the set of input bits. The values in the lookup table are selected such that the wire signal levels output by driver 300 apply the desired pre-scaler levels. That is, each lookup table is specific to a given set of pre-scaler levels. Some embodiments may vary the amount of pre-scaling applied to the cross-pair sub-channel depending on e.g., a signal conductor environment. Thus a specific set of pre-scalers is referred to here as a 'pre-scaler profile', with the mapping encoder enabling switching between different pre-scaler profiles in the following manner. Pre-scaler profiles may be added to the register space connected to the multiplexer and assigned to a unique value of the configuration bits $\{cnfg\}$. In some embodiments, the selection of control bits is further based on the one or more configuration bits $\{cnfg\}$. In the embodiment of FIG. 4, adding one configuration bit to the selection input of multiplexer 460 increases the number of registers 470 to 16. In such an embodiment, a first eight registers 470 may be associated with one pre-scaler profile, while a second eight registers 470 are associated with another pre-scaler profile. While not all eight levels of the drivers may be used by the set of drivers 300 for a given pre-scaler profile, the drivers may be designed to generate an alphabet that is a union of the individual alphabets of each pre-scaler profile. It should be noted that the multiplexing circuitry in FIG. 4 is purely illustrative and should not be considered limiting. The encoder 112 may be a logic circuit composed of logic gates, as well as other circuit components configurable to generate sets of control bits based on the set of input bits.

The configuration bit allows the sets of control bits to be generated based on the pre-scaler profile, i.e. the pre-scaler levels applied can be dynamically adjusted to apply different pre-scaler profiles. For example, a configuration bit value of 0 could represent a 'low' pre-scaling profile of $PS_0=PS_2=0.95$, $PS_1=1.1$ and a configuration bit value of 1 could represent a 'high' pre-scaling profile of $PS_0=PS_2=0.9$, $PS_1=1.2$. These values are purely exemplary and should not be construed as limiting. It will be appreciated that in more complex cases multiple configuration bits can be used—e.g. two configuration bits enabling four possible pre-scaler profiles.

The value(s) of the configuration bit(s) can be set according to various parameters. One exemplary parameter is the signal conductor environment of the N wires, e.g. whether the wires are carried by a PCB or cable. Each signal conductor environment could have an associated pre-scaler profile that is activated by setting the value(s) of the configuration bit(s). The configuration bit value(s) is/are set by a configuration controller 450 during a startup procedure and/or while the communication system is in use. In this latter case, configuration controller 450 can set the configuration bit value(s) based on an instruction from a controller (e.g. a CPU, microcontroller, etc.) This ability to dynamically enable different pre-scaler profiles according to the signal conductor environment can result in a further reduced BER as it allows a pre-scaler profile that is tailored to a particular environment to be used in that environment.

It will be appreciated that the mapping encoder shown in FIG. 4 can be generalized to the N-wire case by accepting N−1 input bits as input and outputting a corresponding set of control bits. There can be any number of configuration bits, with the number of configuration bits increasing as the number of pre-scaler settings increases.

Figure 5:
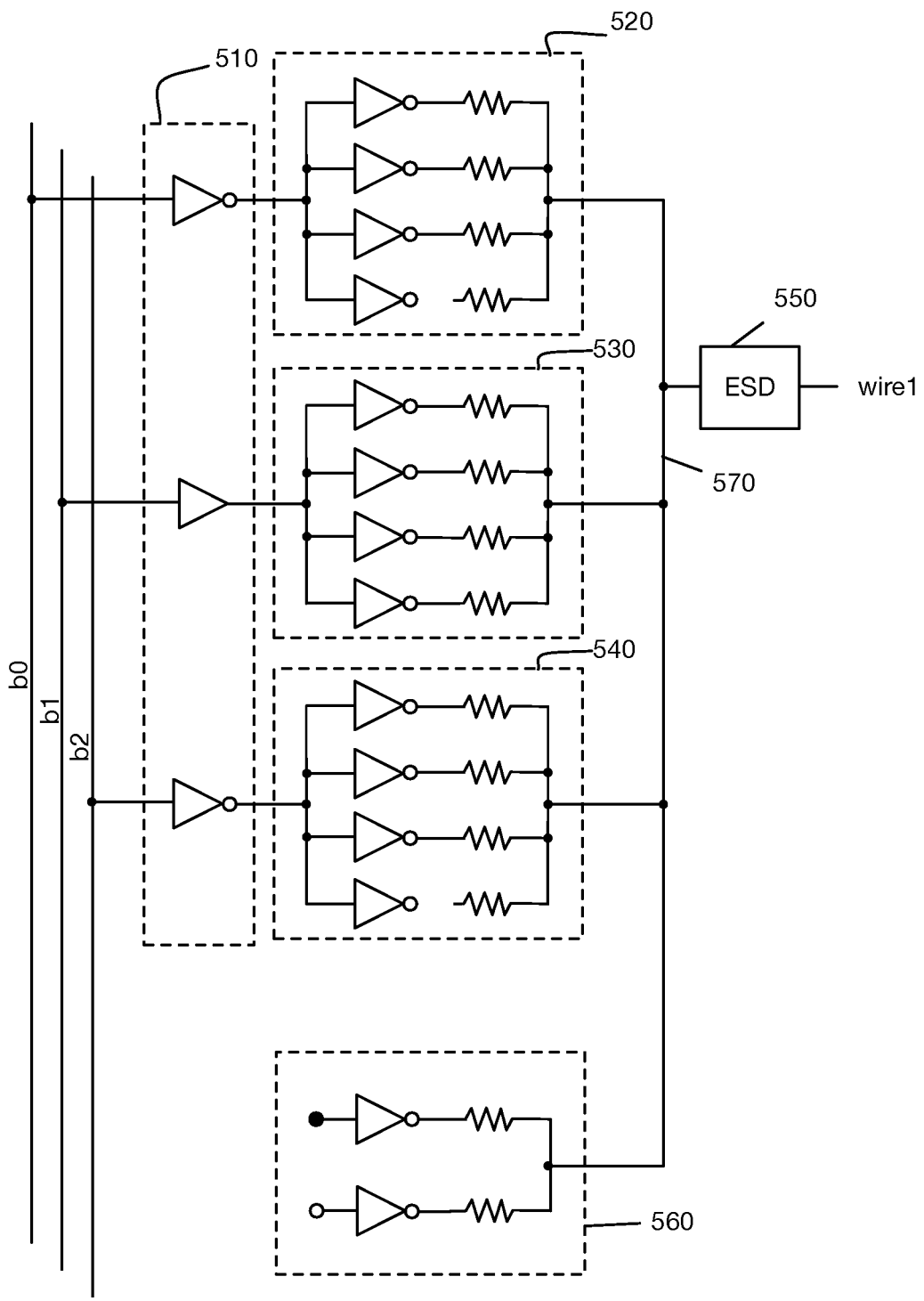
FIG. 5 is a block diagram of another encoder and driver that can implement pre-scaled ODVS, according to an embodiment.

FIG. 5 shows an alternative encoder and driver configuration capable of implementing the ODVS encoding schemes described herein. This configuration includes a signed bit generator 510 that is part of ODVS encoder 112 and which is coupled to a plurality of sub-channel driver element groups 520, 530 and 540 that are part of one of the drivers in the set of drivers 118. FIG. 5 shows only the driver that generates a wire signal level for wire 1. The drivers for the other wires (i.e. wires 0, 1 and 3) may be similarly designed based on the encoding matrix (equation [2] in the 4-wire Hadamard-matrix based encoding case). In total, there will thus be a respective driver for each of the N wires.

Also shown in FIG. 5 is an Electro-Static Discharge (ESD) protection circuit 550. This is arranged in series with the wire output to prevent circuit damage from accidental static discharge to the external signal connection. Typically, such ESD protection includes a series inductance or resistance providing a small impedance at normal operating frequencies but a high impedance to static discharge, along with one or more sets of overvoltage clamping diodes or thyristors to limit fault voltage amplitude. It will be appreciated that the pre-scaled ODVS encoding schemes described herein are not reliant on the presence of ESD protection circuit 550 and so ESD protection circuit 550 can be omitted if desired.

FIG. 5 also shows a non-data-driven (i.e. fixed output) driver element group 560. This is an optional feature that can be included in cases where it is desired to maintain a desired bias or common mode signal level. For example, if a termination voltage halfway between the output "1" and output "0" level is desired, non-data-driven driver element groups may be instantiated in pairs, with one of the pair of driver element groups having its inputs tied high and the other having its input tied low. If an odd number of groups is desired, two non-data-driven groups may be connected but with twice the normal output impedance, together representing a single driver load. Additional non-data-driven driver element groups may be used to further adjust the common mode voltage produced.

In operation, ODVS encoder 112 is configured to generate respective sets of signed input bits for each driver of the set of drivers 118 using the signed bit generator 510. To achieve this, signed bit generator 510 takes the input bits as input and applies a sign to each of the input bits using inverting or non-inverting amplifiers. The sign applied corresponds to the sign of the wire-specific sub-channel element of a corresponding sub-channel vector. Specifically, each element of the pre-scaled Hadamard matrix applies a respective wire-specific sign to each input bit (see equation [2]).

To further illustrate this, FIG. 5 shows as an example a 4-wire configuration having input bits $\{b_0, b_1, b_2\}$. Referring to equation [2], and specifically the second column of the pre-scaled Hadamard matrix, the signs that are to be applied to the input bits for wire 1 are $\{-, +, -\}$. Thus, as can be seen in FIG. 5, each of bits $b_0$ and $b_2$ are coupled to an inverting amplifier in signed bit generator 510 and bit $b_1$ is coupled to a non-inverting amplifier in signed bit generator 510. The output of signed input bit generator is thus $\{-b_0, b_1, -b_2\}$. This configuration is purely exemplary and is not to be construed as limiting.

The outputs of signed bit generator 510, i.e. the signed input bits, are respectively coupled to one of the sub-channel driver element groups 520, 530 and 540. Each sub-channel driver element group has a set of driver elements connected in parallel, a number of which are enabled. Each sub-channel driver element group is configured to accept a respective signed input bit of the respective set of signed input bits at the number of enabled driver elements. The number of enabled driver elements is determined by the wire-specific sub-channel element of the pre-scaled Hadamard matrix.

Continuing with the 4-wire/3 sub-channel example, it is assumed for the purposes of illustration that the pre-scaler settings in this case are $PS_0=PS_2=0.9$ and $PS_1=1.2$ (see Table 1, second row). This can also be expressed as ratio, namely 3:4:3 ($PS_0:PS_1:PS_2$). These values are purely exemplary and should not be construed as limiting.

As shown in FIG. 5, sub-channel driver element group 420 receives signed input bit $-b_0$, sub-channel driver element group 530 receives signed input bit $b_1$ and sub-channel driver element group 540 receives signed input bit $-b_2$. As can be seen, each sub-channel driver element group 520, 530 and 540 includes four driver elements in parallel. Sub-channel driver element groups 520 and 540 have only three of these four driver elements enabled—the fourth driver element in each case is not connected. Sub-channel driver element group 530, however, has all four driver elements enabled. As each driver element is identical, the result is that the output ratio of the sub-channel driver element groups 520, 530 and 540 is $\{3, 4, 3\}$, or equivalently $\{0.9, 1.2, 0.9\}$. This is the same ratio as the pre-scaler ratio set out in the preceding paragraph. The result is that the sub-channel driver element groups weight their output to apply the relevant pre-scaler to each signed input bit. That is, the collective output of the sub-channel driver element groups is $\{-0.9b_1, 1.2b_1, -0.9b_2\}$. These outputs are referred to as weighted analog signal components.

More generally, N−1 sub-channel driver element groups are present for each wire to match the number of signed input bits. The ratio of enabled driver elements (EDE) in each driver element group, $EDE_0:EDE_1: \ldots :EDE_{N-1}$, should match the ratio of pre-scaler components $PS_0:PS_1: \ldots :PS_{N-1}$, assuming that $EDE_0$ receives signed bit $b_0$, $EDE_1$ receives signed bit $b_1$, etc.

The weighted analog signal component that is output by each sub-channel driver element group, and the fixed analog signal component that is output by any fixed output driver element groups that may be present, are received by summation node 570. Summation node 570 is connected to one of the N wires; in the illustrated case, wire 1. Summation node 570 is configured to generate a signal for transmission over the wire it is coupled to by forming a summation of the plurality of weighted analog signal components that it receives, along with any fixed analog signal components that it receives. The resulting summed signal provides a wire signal level corresponding to the pre-scaled ODVS symbol that is to be transmitted over the wire.

It is contemplated that the boost to the cross-pair sub-channel can be adjustable by changing the number of enabled driver elements in various ones of the driver element groups 420, 430, 440. This allows different pre-scaler settings to be applied. For example, each sub-channel driver element group 520, 530 and 540 could include seven driver elements. Three driver elements could be disabled in each of driver element groups 520 and 540 with all of the driver elements in group 530 being enabled to achieve a ratio of {0.8, 1.4, 0.8}. Four driver elements could be disabled in each of groups 520 and 540 in combination with three driver elements being disabled in group 530 to achieve a ratio of {0.9, 1.2, 0.9}. Thus, different boosts to the cross-pair sub-channel can be dynamically applied with this configuration. The adjustment can be performed based on an instruction controller that is not shown in FIG. 5. A configuration can be performed during a startup procedure, and/or at some other time, to set the number of enabled driver elements for each driver element group. This offers a degree of flexibility as it may be desirable to change pre-scaler settings based on various factors such as a physical carrier of the N wires, for example.

It will be appreciated that in some circumstances driver elements may be provided that are never enabled. While it is possible to provide non-identical driver elements to avoid this situation, for circuit symmetry reasons it is often advantageous to include driver elements that are never enabled. Nevertheless, arrangements with non-identical driver elements are also contemplated.

Figure 6A:
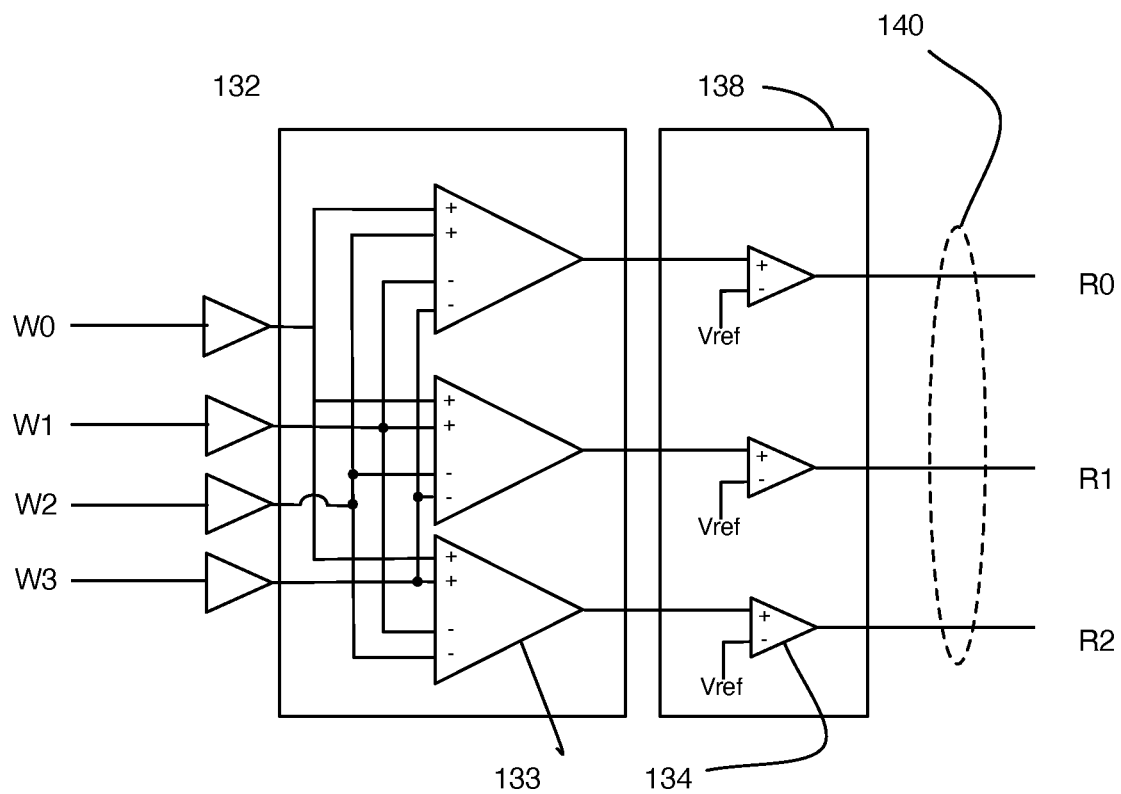
FIGS. 6A and 6B are block diagrams of a receiver that decodes pre-scaled ODVS-encoded information.

FIG. 6A shows a possible implementation of receiver 130. This receiver can be used with either the drivers described in connection with FIGS. 3 and 4 or the drivers described in connection with FIG. 5, among others. Receiver 130 is configured to decode pre-scaled ODVS symbols in the 4-wire/3 sub-channel case.

Receiver 130 includes a set of multi-input comparators (MICs) 132 and a set of binary comparators 138. As shown, the inputs of each MIC are coupled to various combinations of wires 0 to 3. The specific coupling is given by equation [7] in the 4 wire/3 sub-channel case, and the generalized form of this equation in the N-wire case. Taking MIC 133 as an example, this is coupled to wires 0 and 3 at its non-inverting (+) inputs and coupled to wires 1 and 2 at its inverting (−) inputs. This has the effect of performing the following summation: $w_0+w_3-w_1-w_2$. Referring to equation [6], this matches the third column of $H^T$ and hence relates to the sub-channel that carries bit $b_2$.

The output of each MIC is therefore the signal level corresponding to each transmitted bit (assuming no transmission or decoding errors). The bit value is then determined using binary comparators 138. The output of each MIC is provided as input into a respective one of the binary comparators 138, e.g. the output of MIC 133 is received by binary comparator 134. Each binary comparator compares the input from the respective MIC with a reference signal $V_{ref}$ which is set at a level between the high and low values of each bit to recover the bit value. Preferably $V_{ref}$ is at or near the mid-point between the high and low values. For example, in the case where a high value for each bit is 600 mV and a low value for each bit is 200 mV, $V_{ref}$ can be set equal to, or close to, 400 mV. The output of binary comparators 138 is thus a set of recovered bits $\{R_0, R_1, R_2\}$, the values of which correspond to input bits $\{b_0, b_1, b_2\}$ in the case of no errors.

The receiver shown in FIG. 6A is just one configuration of a receiver that is capable of decoding pre-scaled ODVS signals. Other configurations are also possible. For example, four binary comparators can be used to decode pre-scaled ODVS signals as, referring to equation [7], it can be seen that certain combinations of wire signal levels are repeated for different sub-channels. E.g., the combination $w_0-w_1$ appears in both the sub-channel corresponding to $R_0$ and the sub-channel corresponding to $R_2$. One binary comparator could be used to calculate this value for both sub-channels, with the output of the binary comparator being used to decode each sub-channel separately.

The pre-scaler ODVS encoding techniques discussed herein are compatible with other encoding techniques that may be applied in conjunction with the pre-scaler ODVS encoding. In cases where additional encoding is performed, detector 138 includes one or more additional decoding circuits 140.

Figure 6B:
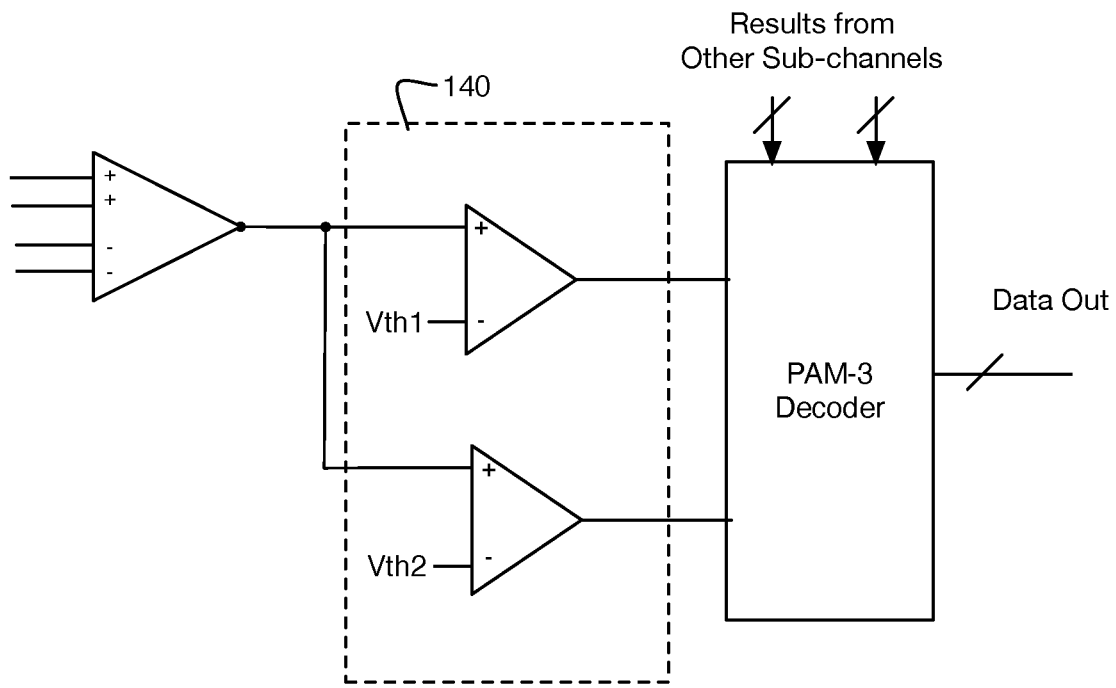

An example of a decoding circuit 140 is provided in FIG. 6B. In this example, a pulse-amplitude modulation (PAM) technique is used in conjunction with the ODVS pre-scaler technique. Specifically, a 3-level PAM technique is used, referred to as PAM-3, and each data symbol may be referred to as a "trit". Briefly, PAM-3 introduces a third allowed signal level in addition to the two binary levels 'high' and 'low'. The third signal level is between the high and low levels, and could thus be termed a 'medium' level. For example, the three possible signal levels could be {1/2, 0, −1/2}. These values are purely exemplary and should not be construed as limiting.

To decode a PAM-3 signal, the output of each MIC 133 is connected to inputs of two binary comparators or data "slicers". The first binary comparator has a first reference voltage $v_{th1}$ as its other input, and the second binary comparator has a second reference voltage $v_{th2}$ as its other input, where $V_{th1}>V_{th2}$. $V_{th1}$ and $V_{th2}$ are respectively set so as to be at or near the mid-point between each pair of possible signal levels. For example, if the possible signal levels are {1/2, 0, −1/2} then $V_{th1}=1/4$ and $V_{th2}=-1/4$ is an appropriate setting for the reference signals. As in other parts of this specification, these values are placeholders for actual wire signal levels that indicate the relative size of the voltage as well as the polarity. These values are purely exemplary and should not be construed as limiting.

This arrangement of binary comparators enables the wire signal level to be determined as follows. Here, binary comparator 1 receives $V_{th1}$ and binary comparator 2 receives $V_{th2}$.

TABLE 3

| Binary comparator 1 | Binary comparator 2 | Wire signal level |
|---|---|---|
| Low | Low | Low |
| Low | High | Medium |
| High | High | High |

The output of each binary comparator is input to a PAM-3 decoder as shown in FIG. 6B. The PAM-3 decoder essentially performs the operation shown in the 'wire signal level' column of Table 3 above, namely the outputs of each binary comparator are evaluated by the PAM-3 decoder to determine the wire signal level and corresponding data symbol value ($R_1$ in the example of FIG. 6B). The PAM-3 decoder may receive the results from the PAM-3 detectors connected to each sub-channel MIC 133 and over a number of sequential signaling intervals and reconstitute a received set of data.

More generally, a PAM-X encoding scheme can be combined with pre-scaled ODVS, where X is any integer greater than 2. In each case a PAM-X encoder and PAM-X decoder that operate on the principles outlined above in respect of PAM-3 are included in the communication system to perform the PAM-X encoding and decoding, respectively.

Figure 7:
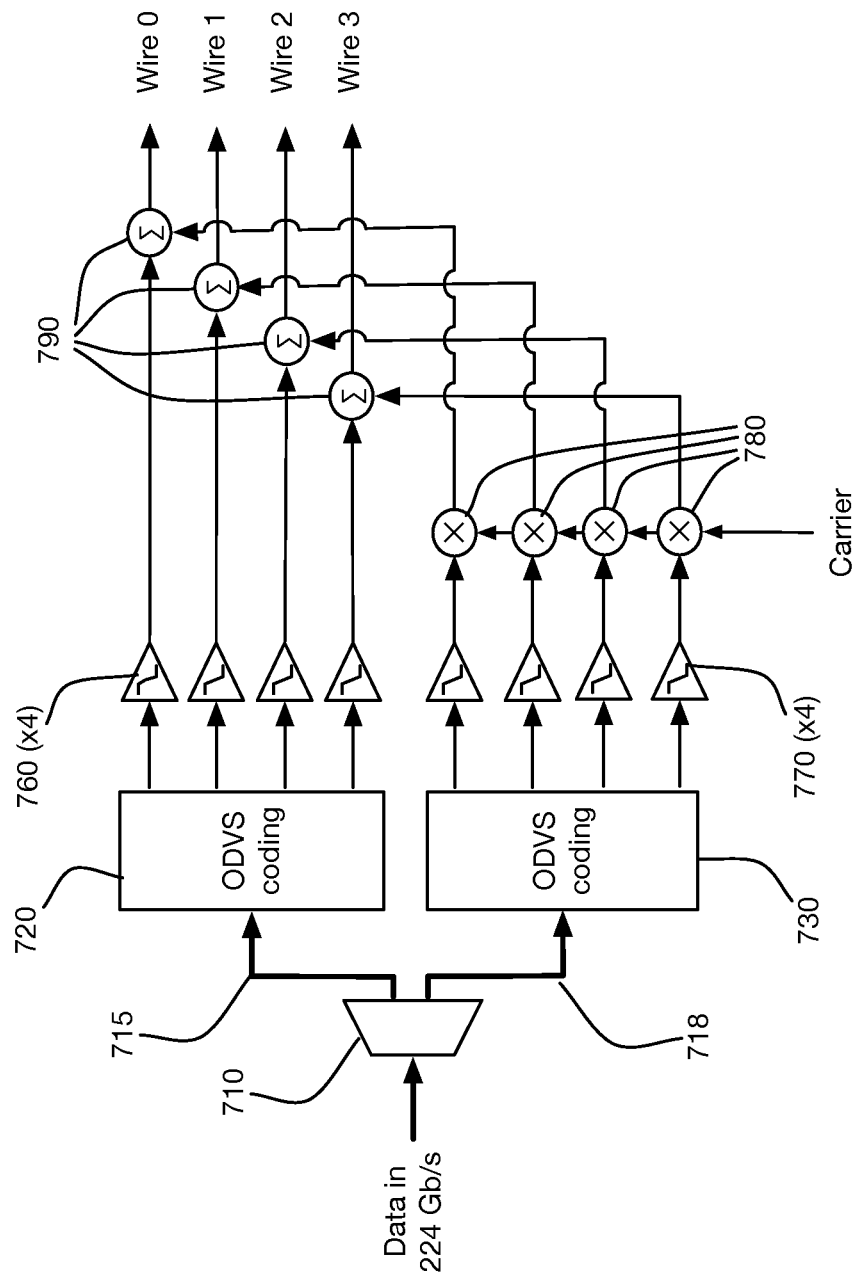
FIG. 7 is a block diagram of a transmitter that implements multi-tone pre-scaled ODVS, according to an embodiment.

Referring now to FIG. 7, another encoding technique that can be combined with pre-scaled ODVS is multi-tone encoding as described in [Hormati]. This refers to the use of one or more carrier frequency bands alongside the baseband to transmit additional data simultaneously with the baseband over carrier band frequency channels.

FIG. 7 shows in schematic form a configuration for transmitter 107 that is capable of generating multi-tone pre-scaled ODVS signals. Transmitter 107 includes a baseband pre-scaled ODVS encoding circuit 702 and a carrier band pre-scaled ODVS encoding circuit 704.

Data is input to a channel selection multiplexer 710, in this case at a purely exemplary rate of 224 Gb/s—this value should not be construed as limiting. Multiplexer 710 stripes the incoming data over a baseband ODVS encoding circuit 702 via baseband wire 715 and a carrier band ODVS encoding circuit 704 via carrier wire 718. As FIG. 7 uses 4-wire pre-scaled ODVS encoding, three bits can be transmitted per clock cycle. Multiplexer 710 therefore switches at a rate of 74.6 GHz to direct 3 consecutive bits of data along each encoding circuit 702, 704 per switching cycle. These numbers are purely exemplary and should not be construed as limiting.

Baseband ODVS encoding circuit 702 and carrier band ODVS encoding circuit 704 each operate as described above in connection with FIG. 3 or FIG. 5. The output of baseband ODVS encoder 720 is a set of baseband symbols referred to collectively as a baseband codeword. Similarly, the output of carrier band ODVS encoder 730 is a set of carrier-modulated symbols referred to collectively as a carrier-modulated codeword.

The baseband symbols output by baseband circuit 702 are low pass filtered by low pass filters 760 (one per symbol) to remove any high frequency noise that could interfere with the carrier modulation. After filtering, each wire is coupled to a respective summing node 790 for summing with the carrier-modulated symbols to create a superposition of baseband symbols and carrier-modulated symbols for transmission over wires $w_0$, $w_1$, $w_2$ and $w_3$ to receiver 130.

The stream of symbols output by carrier band circuit 704 are low pass filtered by low pass filters 770 (one per symbol) in the same manner as the baseband symbols. After filtering, each stream of symbols is coupled to a respective mixer 780 that mixes the low-pass filtered symbols with a carrier frequency signal. The carrier frequency signal is locally generated by a radio frequency oscillator circuit (not shown) or an alternative circuit capable of producing a carrier frequency signal with relatively low jitter.

The output of the mixers 780 is a set of carrier-modulated pre-scaled ODVS symbols. The carrier-modulated symbols are received at respective summing nodes 790 where they are superposed with the baseband symbols as described above.

It will be appreciated that the arrangement shown in FIG. 7 can be generalized to any number of carrier bands by adding additional carrier band ODVS encoding circuits like circuit 704. Each additional carrier band ODVS encoding circuit can operate at a different frequency. It is also possible to provide two carrier band ODVS encoding circuits operating at the same frequency but orthogonally to one another, i.e. one circuit applies a sine carrier signal of frequency f and the other applies a cosine carrier signal of frequency f. This allows two ODVS encoding circuits per carrier frequency to be used. A suitable frequency for a carrier band is typically in the GHz range, e.g. between 10 GHz and 100 GHz.

While it is possible to use the same set of pre-scalers for encoding the baseband symbols and carrier-modulated symbols, this is not required. It is contemplated that in some cases it would be desirable to use different pre-scaler values for the baseband encoding and carrier band encoding. For example, it may be discovered that the cross-pair sub-channel is more lossy at the carrier frequency than at the baseband frequency. In this case, a pre-scaler for the carrier-modulated cross-pair sub-channel that is greater than the pre-scaler for the baseband cross-pair sub-channel can be used to offset this additional loss.

In general, the carrier band pre-scalers can be identical to the baseband pre-scalers, share some common elements with the baseband pre-scalers, or be entirely different to the baseband pre-scalers. Similarly, in the case where multiple carrier bands are used, each can have its own unique set of pre-scalers, share some pre-scalers with other carrier bands, or have an identical set of pre-scalers to other carrier bands.

Figure 8:
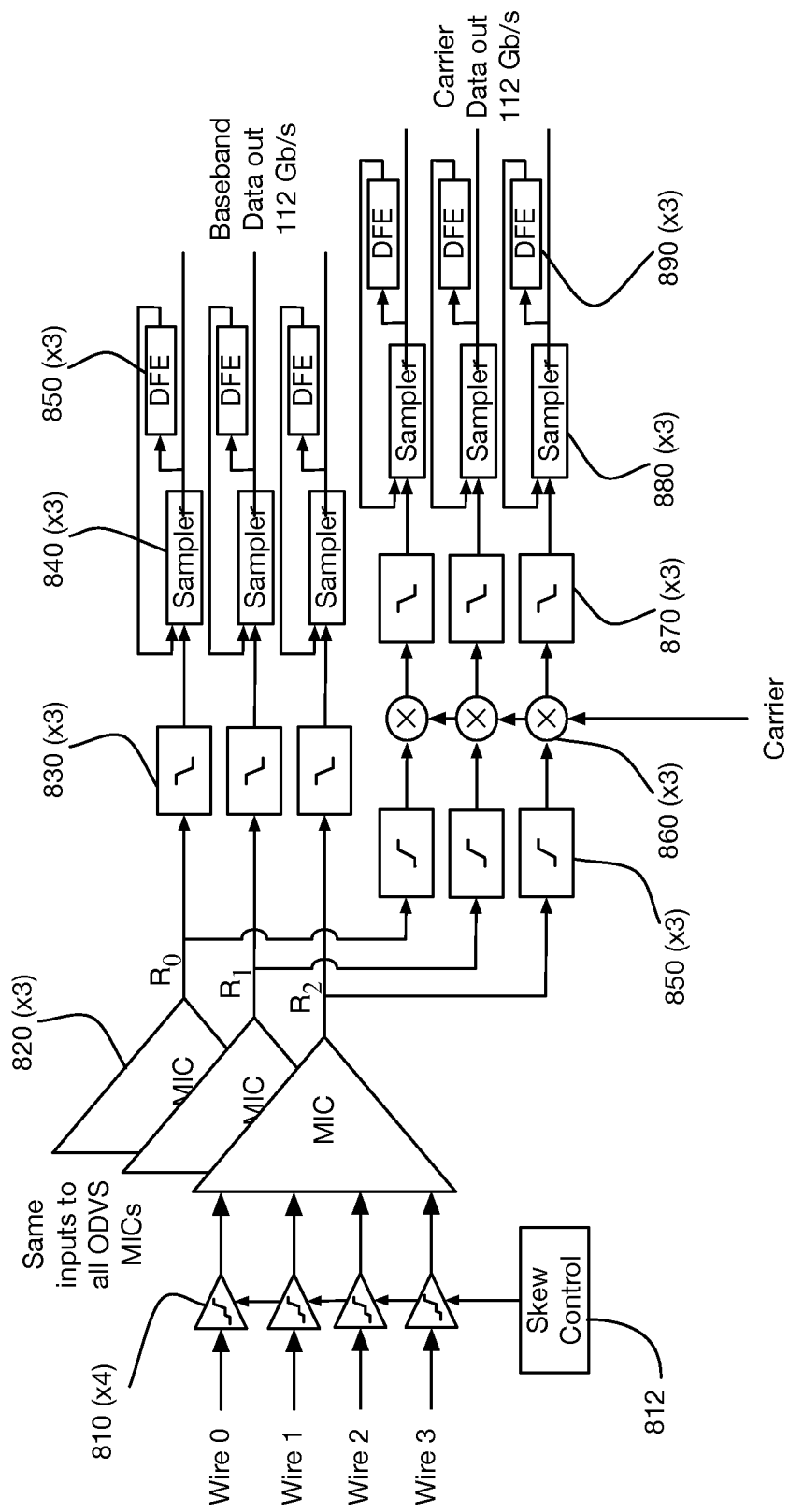
FIG. 8 is a block diagram of a receiver that decodes multi-tone pre-scaled ODVS.

FIG. 8 shows in schematic form a multi-tone receiver that can be used to receive and decode multi-tone pre-scaled ODVS signals generated by the transmitter of FIG. 7. The receiver 130 receives superposed baseband and carrier-modulated symbols from wires $w_0$ to $w_3$ and passes each symbol through a respective CTLE 810 to undo as far as possible any undesirable modifications to these symbols caused by the propagation over the wires. CTLEs 810 can be omitted in situations where such equalization is not necessary.

FIG. 8 includes a skew control circuit 812 configured to adjust the relative timing of each wire to ensure that the symbols are timely received by each MIC to maximize the eye opening of the MIC outputs. The skew control circuit 812 may be configured to operate on the outputs of samplers 880 that operate on the passband MIC outputs in order to determine the skew control signal for adjusting analog delay values of each wire. In some embodiments the skew control signal can be conveyed to the drivers in the transmitter to offset the relative transmit times of each symbol. However, this should not be considered limiting as it is possible to omit skew control circuit 812—this corresponds to cases where the skew of wires $w_0$ to $w_3$ is acceptable if left uncorrected.

The multi-tone receiver also includes a set of MICs 820. In this case there are three MICs, one for each of the three sub-channels. In the general N-wire case, N−1 MICs are required. Each MIC 820 is configured to operate as discussed above in connection with MICs 132.

In FIG. 8, the output of each MIC is thus a superposition of the baseband and carrier-modulated bits. This is labelled $\{R_0, R_1, R_2\}$ in FIG. 8. It remains to separate out the baseband bits and carrier-modulated bits and to sample them to determine their values. This separation and sampling is performed by baseband bit decoding circuit 822 and carrier band bit decoding circuit 824.

In some embodiments, the carrier-modulated and baseband symbols may be filtered prior to MIC detection. In such an embodiment, a combined MIC/demodulation circuit as described in [Tajalli] may be used to simultaneously perform detection and demodulation of the carrier-modulated symbols.

Each of baseband bit decoding circuit 822 and carrier band bit decoding circuit 824 are provided with $\{R_0, R_1, R_2\}$ as input. Baseband bit decoding circuit 822 low pass filters each bit superposition $\{R_0, R_1, R_2\}$ using low pass filters 830. This removes the higher frequency carrier-modulated components of the signal, leaving only the baseband components. The low pass filters 830 could be four pole Butterworth low pass filters, for example. The baseband bit decoding circuit 822 then uses a set of samplers 840, one per signal, to determine the bit values by measuring the signal amplitude at a particular moment based on receiver clock Rclk 145. At this point, the baseband bit values are known, i.e. the baseband bits have been decoded. Each decoded bit is also presented to a respective decision feedback equalizer (DFE) 850, producing a DFE correction signal used to adjust that bit's sampler threshold. Each DFE computation 850 is independent, and will provide both correction of transport-channel-induced inter-symbol interference (ISI) and of intentionally generated transmitter ISI compensation. DFEs 850 can be omitted if not required.

Carrier band bit decoding circuit 824 high pass filters each bit superposition $\{R_0, R_1, R_2\}$ using high pass filters 850. This removes the lower frequency baseband components of the signal, leaving only the carrier-modulated components. The high pass filters 780 could be second order Butterworth high pass filters, for example. The carrier band bit decoding circuit 824 then mixes the output of the high pass filters 850 with the carrier signal using mixers 860. The carrier signal also inputted into mixers 860 is the same carrier signal that was used by mixers 780 in the transmitter to generate the carrier-modulated signal before transmission. This mixing has the effect of removing the carrier modulation and reverting the signals back to baseband. From this point onwards the carrier band bit decoding circuit 824 operates in the same manner as the baseband bit decoding circuit 822, noting in particular that low pass filters 870 operate in the same manner as low pass filters 830, samplers 880 operate in the same manner as samplers 840 and DFEs 890 operate in the same manner as DFEs 850.

The supplementary encoding techniques described herein can all be combined with pre-scaled ODVS encoding. Multiple supplementary encoding techniques can be used together in any combination, e.g. PAM-X with multi-tone encoding, etc.

Figure 9:
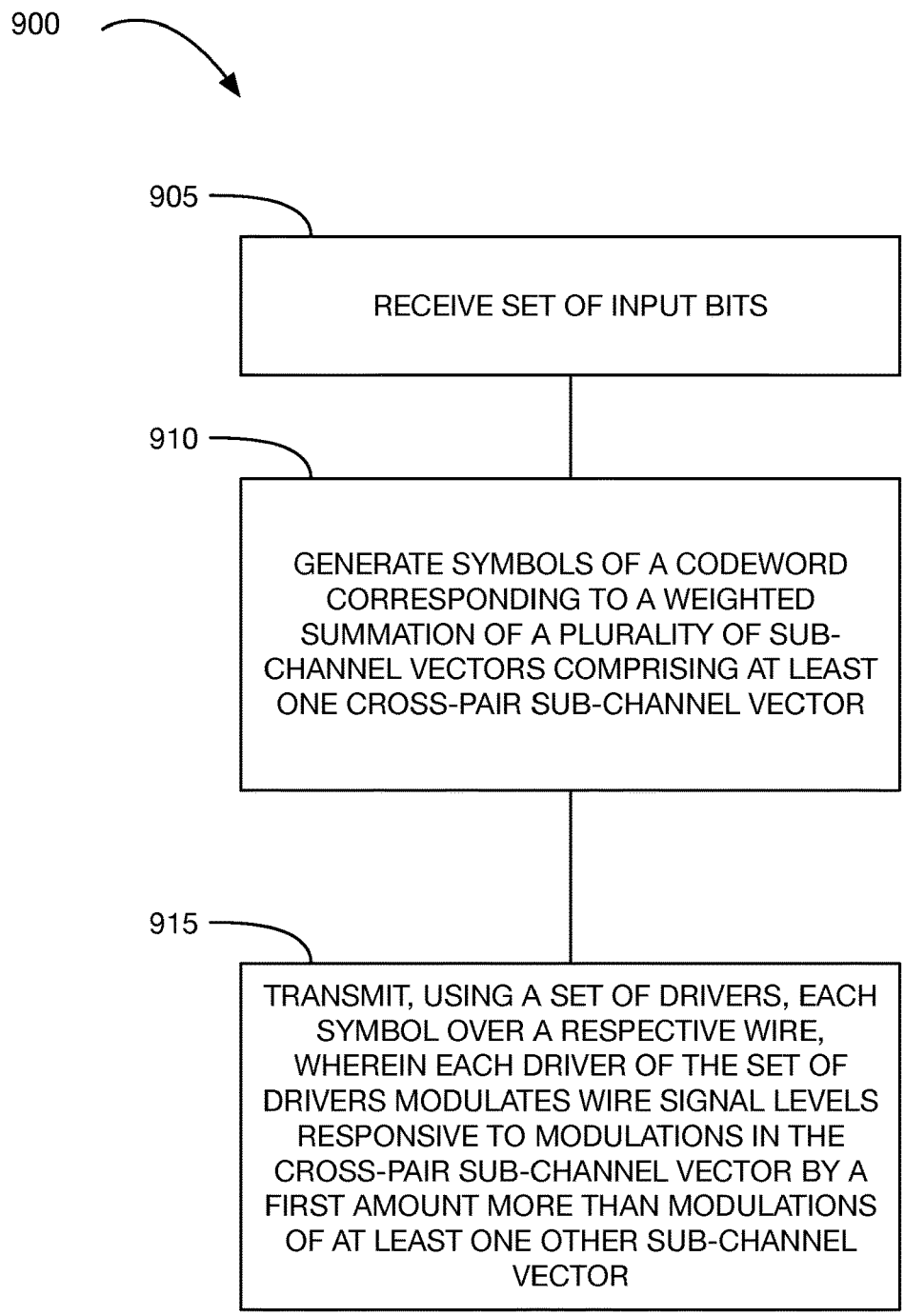
FIG. 9 shows a method for performing pre-scaled ODVS signalling, according to an embodiment.

FIG. 9 shows a method 900 that can be performed by a communication system that implements pre-scaled ODVS encoding, e.g. the communication system of FIG. 1.

In step 900, a multi-wire bus is provided. The multi-wire bus has N wires arranged in pairs of wires, N being an integer greater than two and being a multiple of two. This is as shown in FIG. 1.

In step 905, an orthogonal differential vector signalling encoder (e.g. encoder 112) receives a set of input bits.

In step 910, the ODVS encoder responsively generates a set of symbols of a codeword of a vector signalling code. The codeword corresponds to a weighted summation of a plurality of sub-channel vectors that correspond to rows of a transmitter encoding matrix (see e.g. equation [2]), the plurality of sub-channel vectors comprising at least one cross-pair sub-channel vector having same-signed vector components carried by at least one of the pair of wires.

In step 915, a set of drivers (e.g. drivers 118) transmit each symbol of the codeword over a respective wire of the multi-wire bus by driving the respective wire with a wire signal level, wherein for a given symbol of the vector signalling code, each driver of the set of drivers drives the wire signal level of the respective wire responsive to modulations of the at least one cross-pair sub-channel vector by a first amount more than modulations of at least one other sub-channel vector.

The first amount can be selected based on a signal conductor environment of the N wires, and this may be identified during a startup procedure. The signal conductor environment can be a PCB or an electrical cable. Reference is made to FIGS. 2A and 2B and their related discussion with regard to PCB traces and wires housed in electrical cables.

The method of FIG. 8 can additionally incorporate any one or more of the steps set out in the appended claims and/or any one or more of the features described herein.

To this point this disclosure has focussed on Hadamard-matrix based encoding schemes. However, it is also possible to use a transmitter encoding matrix that is not a Hadamard matrix. In such cases one or more cross-pair sub-channels can be present such that the pre-scaler techniques discussed above are also applicable. These alternative transmitter encoding matrices have at least one sub-channel that is associated with only a sub-set of the total number of wires. Stated alternately, the signals that encode some of the bits are split across only a sub-set of the wires, not all of the wires as in Hadamard matrix-based encoding schemes.

One example of a non-Hadamard-based transmitter encoding matrix that can be used for ODVS encoding is referred to herein as 'Chord Non-Return to Zero-7' (CNRZ-7). This family of ODVS codes is usable over an eight-wire bus and is capable of transmitting seven bits per unit interval. CNRZ-7 codes do not carry every bit on every wire. Instead, a subset of the input bits are carried on each wire, one input bit per sub-channel. This is shown graphically in FIG. 10. Each wire is illustrated in FIG. 10 with a table below indicating whether the wire carries a positively-signed component of a given bit (+), a negatively-signed component of a given bit (−), or no component of a given bit (0). This can equivalently be thought of as each wire carrying only a subset of the total set of sub-channels, e.g. wire 0 carries only sub-channels 3, 5 and 6 in the example above. The sub-channel index shown to the left of the table in FIG. 10. The wires can be physically arranged as shown in FIG. 2A or 2B, for example, with it being appreciated that eight wires are present in total rather than four.

In the case of CNRZ-7, each wire has non-zero transmitter encoding matrix elements across three sub-channels, meaning that each wire carries a superposition of signals corresponding to exactly three bits. The transmitter elements are selected such that the sub-channels of the transmitter encoding matrix are mutually orthogonal, allowing each bit to be recovered at the receiver independently of the other bits. A sample CNRZ-7 transmitter encoding matrix is shown below as equation [8]. The sub-channel index is shown in bold to the left of the transmitter encoding matrix and the wire number is shown in bold above the transmitter encoding matrix.

$$\begin{array}{c} \phantom{0} \\ 0 \\ 1 \\ 2 \\ 3 \\ 4 \\ 5 \\ 6 \end{array} \begin{array}{cccccccc} w_0 & w_1 & w_2 & w_3 & w_4 & w_5 & w_6 & w_7 \\ \left[\begin{array}{cccccccc} 0 & 0 & 0 & 0 & 0 & 0 & \frac{4}{9} & \frac{-4}{9} \\ 0 & 0 & 0 & 0 & \frac{1}{3} & \frac{1}{3} & \frac{-1}{3} & \frac{-1}{3} \\ 0 & 0 & 0 & 0 & \frac{4}{9} & \frac{-4}{9} & 0 & 0 \\ \frac{2}{9} & \frac{2}{9} & \frac{2}{9} & \frac{2}{9} & \frac{-2}{9} & \frac{-2}{9} & \frac{-2}{9} & \frac{-2}{9} \\ 0 & 0 & \frac{4}{9} & \frac{-4}{9} & 0 & 0 & 0 & 0 \\ \frac{1}{3} & \frac{1}{3} & \frac{-1}{3} & \frac{-1}{3} & 0 & 0 & 0 & 0 \\ \frac{4}{9} & \frac{-4}{9} & 0 & 0 & 0 & 0 & 0 & 0 \end{array}\right] \end{array} \quad [8]$$

It will be appreciated that the ordering of rows and/or columns can be adjusted without departing from the scope of this disclosure. Additionally or alternatively, the signs of the elements of the CNRZ-7 weighting matrix can be swapped, and this variation is also within the scope of this disclosure.

As can be seen from equation [8], each sub-channel of the CNRZ-7 weighting matrix has non-zero weights of uniform absolute magnitude. The absolute magnitude of the non-zero weights differ between sub-channels. For example, sub-channel 0 of the matrix above has all non-zero weights of absolute magnitude 4/9, whereas sub-channel 1 of the matrix above has all non-zero weights of absolute magnitude 1/3. These values are purely exemplary and deviations from these values are both possible and within the scope of this disclosure.

CNRZ-7 codes break the eight wires of the bus into four pairs of wires, two tetrads of wires and one octad of wires. These groups of wires are formed as follows in the case of equation [8]:

Wire pairs: $\{w_0, w_1\}$; $\{w_2, w_3\}$; $\{w_4, w_5\}$; $\{w_6, w_7\}$
Wire tetrads: $\{w_0, w_1, w_2, w_3\}$; $\{w_4, w_5, w_6, w_7\}$
Wire octad: $\{w_0, w_1, w_2, w_3, w_4, w_5, w_6, w_7\}$ Four pair sub-channels (0, 2, 4 and 6) are each carried by a respective pair of wires, two tetrad sub-channels (1 and 5) are each carried by a respective tetrad of wires and one octad sub-channel (3) is carried by an octad of wires. The absolute magnitude of the non-zero transmitter weights for each type of grouping of wires is the same—in the case of equation [8], each pair of wires has a non-zero transmitter weight of absolute magnitude 4/9, each tetrad of wires has a non-zero transmitter weight of absolute magnitude 1/3 and the octad of wires has a non-zero transmitter weight of absolute magnitude 2/9. This symmetry means that the alphabet of CNRZ-7 codes is relatively simple, which translates into a relatively simple driver configuration.

Each group of wires is balanced. That is, the voltage on half of each group of wires is equal in magnitude but opposite in sign to the voltage on the other half of each group of wires. For example, the wire pair $\{w_0, w_1\}$ has voltages $\{4/9, -4/9\}$. Similarly, the wire tetrad $\{w_0, w_1, w_2, w_3\}$ has voltages $\{1/3, 1/3, -1/3, -1/3\}$. The octad is also balanced as it has voltages $\{2/9, 2/9, 2/9, 2/9, -2/9, -2/9, -2/9, -2/9\}$.

Assuming a physical wire layout that mirrors the wire enumeration, i.e. the wires are physically arranged in numerical order (see FIG. 10), the current carried by each group of wires is balanced over the group. One half of each group of wires are each driven by a voltage that is equal in magnitude but opposite in polarity to the voltage driving each of the other half of the group of wires. Conceptually, each half of each group can be thought of as acting as one leg of a differential pair, but in the case of the tetrad and octad the leg is formed of multiple wires rather than a single wire. The balancing of the current in this way results in a relatively high signal to noise ratio for an eight-wire bus because signal bleed between wires is kept relatively low.

Another CNRZ-7 code is shown below in equation [9]. This CNRZ-7 code is a variant selected such that the signal to noise ratio for each sub-channel is the same. As above, the sub-channel index is shown in bold to the left of the matrix.

$$\begin{array}{c} 0 \\ 1 \\ 2 \\ 3 \\ 4 \\ 5 \\ 6 \end{array} \left[\begin{array}{cccccccc} 0 & 0 & 0 & 0 & 0 & 0 & 0.4531 & -0.4531 \\ 0 & 0 & 0 & 0 & 0.32039 & 0.32039 & -0.32039 & -0.32039 \\ 0 & 0 & 0 & 0 & 0.4531 & -0.4531 & 0 & 0 \\ 0.22651 & 0.22651 & 0.22651 & 0.22651 & -0.22651 & -0.22651 & -0.22651 & -0.22651 \\ 0 & 0 & 0.4531 & -0.4531 & 0 & 0 & 0 & 0 \\ 0.32039 & 0.32039 & -0.32039 & -0.32039 & 0 & 0 & 0 & 0 \\ 0.4531 & -0.4531 & 0 & 0 & 0 & 0 & 0 & 0 \end{array}\right] \quad [9]$$

It can be seen that the transmitter encoding matrix of equation [9] has the same properties as that of equation [8] discussed above.

A further CNRZ-7 code is shown below in equation [10]. This code has a lower signal to noise ratio than the CNRZ-7 codes above but does have a relatively small alphabet, which translates into a reduction in the complexity of the drivers required to drive the wires. This CNRZ-7 code uses non-zero weights of uniform absolute magnitude for all entries in the transmission weighting matrix. This means that all of the sub-channels of this CNRZ-7 code have non-zero weights of uniform absolute magnitude. The alphabet is therefore just 4 symbols. In the scheme discussed above where a bit value of +1 is mapped to +1/2 and a bit value of 0 is mapped to −1/2, the four levels are: +1/2, +1/6, −1/6, −1/2. It will be appreciated that this disclosure is however not limited to these particular values as other schemes are equally possible (e.g. bit value +1 maps to +1 and bit value 0 maps to −1).

$$\left[\begin{array}{cccccccc} 0 & 0 & 0 & 0 & 0 & 0 & \frac{1}{3} & \frac{-1}{3} \\ 0 & 0 & 0 & 0 & \frac{1}{3} & \frac{1}{3} & \frac{-1}{3} & \frac{-1}{3} \\ 0 & 0 & 0 & 0 & \frac{1}{3} & \frac{-1}{3} & 0 & 0 \\ \frac{1}{3} & \frac{1}{3} & \frac{1}{3} & \frac{1}{3} & \frac{-1}{3} & \frac{-1}{3} & \frac{-1}{3} & \frac{-1}{3} \\ 0 & 0 & \frac{1}{3} & \frac{-1}{3} & 0 & 0 & 0 & 0 \\ \frac{1}{3} & \frac{1}{3} & \frac{-1}{3} & \frac{-1}{3} & 0 & 0 & 0 & 0 \\ \frac{1}{3} & \frac{-1}{3} & 0 & 0 & 0 & 0 & 0 & 0 \end{array}\right] \quad [10]$$

This CNRZ-7 code retains the same wire groupings as the other CNRZ-7 codes, i.e. four pairs of wires, two tetrads of wires and one octad of wires. This distinguishes the CNRZ-7 codes from the Hadamard-matrix based codes discussed earlier.

A receiver weighting matrix for CNRZ-7 codes is shown below in equation [11]. The wire indices are shown to the left of the receiver weighting matrix. The receiver weighting matrix for CNRZ-7 codes is relatively simple in that the weights are all uniform, with only the sign differing between weights. The ordering of rows and/or columns can be changed from that shown below without departing from the scope of this disclosure. Additionally or alternatively, the sign of each weight of the receiver matrix can be swapped without departing from the scope of this disclosure. All of the CNRZ-7 codes discussed above can be decoded with this receiver matrix.

$$\begin{array}{c} w_0 \\ w_1 \\ w_2 \\ w_3 \\ w_4 \\ w_5 \\ w_6 \\ w_7 \end{array} \begin{bmatrix} 0 & 0 & 0 & 1 & 0 & 1 & 1 \\ 0 & 0 & 0 & 1 & 0 & 1 & -1 \\ 0 & 0 & 0 & 1 & 1 & -1 & 0 \\ 0 & 0 & 0 & 1 & -1 & -1 & 0 \\ 0 & 1 & 1 & -1 & 0 & 0 & 0 \\ 0 & 1 & -1 & -1 & 0 & 0 & 0 \\ 1 & -1 & 0 & -1 & 0 & 0 & 0 \\ -1 & -1 & 0 & -1 & 0 & 0 & 0 \end{bmatrix} \quad [11]$$

The wire grouping discussed above can also be seen in the receiver weighting matrix. Bits ($R_i$) are recovered using this matrix in the following manner:

$R_0 = w_6 - w_7$ $R_1 = w_4 + w_5 - w_6 - w_7$ $R_2 = w_4 - w_5$ $R_3 = w_0 + w_1 + w_2 + w_3 - w_4 - w_5 - w_6 - w_7$ $R_4 = w_2 - w_3$ $R_5 = w_0 + w_1 - w_2 - w_3$ $R_6 = w_0 - w_1$

In this case, bits $R_0$, $R_2$, $R_4$ and $R_6$ are associated with respective pairs of wires, bits $R_1$ and $R_5$ are associated with a respective tetrad of wires and bit $R_3$ is associated with an octad of wires. This is purely exemplary and different relationships between the recovered bits and groups of wires can alternatively be assigned without departing from the scope of this disclosure.

In summary, CNRZ-7-based transmissions requires an eight-wire bus essentially constructed as shown in FIG. 1, other than that there are eight wires instead of four. Transmitter 107 is configured to generate pre-scaled CNRZ-7 codewords, e.g. according to equation [8], [9] or [10], and receiver 130 is configured to decode pre-scaled CNRZ-7 codewords according to equation [11]. The decoding can be performed by MICs 132 operating as discussed above in connection with FIG. 6A, with the difference that the inputs of each MIC are selected based on equation [11].

Encoder 112 and drivers 118 can operate as described above with reference to FIGS. 3 to 5, with the difference that the encoding is based on a CNRZ-7 code, e.g. equation [8], [9] or [10]. Referring to FIG. 5 specifically, it will be appreciated that, unlike in the case of the Hadamard-based codes discussed above, each driver will not receive all of the input bits because each wire in CNRZ-7 does not carry signals relating to every bit. The sub-channel driver elements groups of FIG. 5 are selected with this in mind. The operating principles are otherwise similar.

In the same manner as with Hadamard-matrix based codes, CNRZ-7 codes are compatible with other encoding schemes as may be applied by pre-encoder 110 of FIG. 1. Any one or more of the encoding schemes applied by pre-encoder 110 discussed above can be applied in combination with CNRZ-7. Reference is made to FIGS. 7 and 8 and the related discussion in this regard.

This disclosure thus contemplates a communication system that uses CNRZ-7 based encoding. Such a communication system comprises a bus having eight wires physically arranged as four pairs of wires. The communication system also comprises an orthogonal differential vector signalling encoder configured to receive a set of seven input bits and to responsively generate a set of symbols of a codeword of a vector signalling code, the codeword corresponding to a weighted summation of a plurality of sub-channel vectors that correspond to rows of a transmitter encoding matrix. Each of the sub-channel vectors has a plurality of non-zero elements, each of the plurality of non-zero elements respectively corresponding to one of the eight wires. Four of the plurality of sub-channel vectors are pair sub-channel vectors having non-zero elements associated with only two of the eight wires, two of the plurality of sub-channel vectors are tetrad sub-channel vectors having non-zero elements associated with only four of the eight wires, and one of the plurality of sub-channel vectors is an octad sub-channel vector having non-zero elements associated with all of the eight wires. For a given sub-channel vector of the plurality of sub-channel vectors, each of the plurality of non-zero elements of the given sub-channel vector has a common absolute magnitude. The communication system also comprises a set of drivers configured to transmit each symbol of the codeword over a respective wire of the bus by driving the respective wire with a wire signal level.

This communication system can be configured so that, for a given sub-channel vector of the plurality of sub-channel vectors, one half of the wires associated with the given sub-channel vector have associated non-zero elements that have an equal magnitude but opposite sign to non-zero elements associated with the other half of the wires associated with the given sub-channel vector.

Each pair sub-channel vector can be associated with two physically adjacent wires of the eight wires, where in some cases all of the pair sub-channel vectors have non-zero elements with a common absolute magnitude. Additionally or alternatively, each tetrad sub-channel vector can be associated with two pairs of wires of the eight wires, the two pairs of wires arranged physically adjacent one another and each pair of the two pairs of wires comprising two physically adjacent wires. In some cases, all of the tetrad sub-channel vectors have non-zero elements with a common absolute magnitude.

The communication system can be configured so that each wire of the eight wires is associated with one pair sub-channel vector, one tetrad sub-channel vector and one octet sub-channel vector. Additionally or alternatively, each wire of the eight wires can be associated with elements of only three sub-channel vectors of the plurality of sub-channel vectors.

The communication system can be configured such that it makes use of a transmitter encoding matrix as shown in equation [8], or equation [9], or equation [10]. In any of these cases, a receiver decoding matrix according to equation [11] can be used in a receiver that may be part of the communication system.

A corresponding communication method is also contemplated, where this method comprises receiving a set of seven input bits at an orthogonal differential vector signalling encoder coupled to a bus having eight wires physically arranged as four pairs of wires. The orthogonal differential vector signalling encoder responsively generates a set of symbols of a codeword of a vector signalling code, the codeword corresponding to a weighted summation of a plurality of sub-channel vectors that correspond to rows of a transmitter encoding matrix, each of the sub-channel vectors having a plurality of non-zero elements, each of the plurality of non-zero elements respectively corresponding to one of the eight wires. Four of the plurality of sub-channel vectors are pair sub-channel vectors having non-zero elements associated with only two of the eight wires, two of the plurality of sub-channel vectors are tetrad sub-channel vectors having non-zero elements associated with only four of the eight wires, and one of the plurality of sub-channel vectors is an octad sub-channel vector having non-zero elements associated with all of the eight wires. For a given sub-channel vector of the plurality of sub-channel vectors, each of the plurality of non-zero elements of the given sub-channel vector has a common absolute magnitude. The communication method also includes transmitting, by a set of drivers, each symbol of the codeword over a respective wire of the bus by driving the respective wire with a wire signal level.

The method can additionally include any one or more of the features described herein in connection with CNRZ-7.

Referring to equation [8] as an illustrative example, it can be seen that sub-channels 1, 3 and 5 of CNRZ-7 codes are cross-pair sub-channels as each of these sub-channels includes at least one pair of wires that are physically adjacent and which are driven by a voltage of a common sign. The same is true in the case of equation [9] and equation [10]. Generally, CNRZ-7 codes include three cross-pair sub-channels that suffer from increased noise. A pre-scaler can be applied to the CNRZ-7 codes to boost the cross-pair sub-channels and increase the overall signal to noise ratio of the CNRZ-7 codes.

To illustrate this, a pre-scaled variant of the CNRZ-7 code of equation [8] is shown below in equation [12].

$$\begin{bmatrix} 0 & 0 & 0 & 0 & 0 & 0 & \frac{4PS_p}{9} & \frac{-4PS_p}{9} \\ 0 & 0 & 0 & 0 & \frac{PS_t}{3} & \frac{PS_t}{3} & \frac{-PS_t}{3} & \frac{-PS_t}{3} \\ 0 & 0 & 0 & 0 & \frac{4PS_p}{9} & \frac{-4PS_p}{9} & 0 & 0 \\ \frac{2PS_o}{9} & \frac{2PS_o}{9} & \frac{2PS_o}{9} & \frac{2PS_o}{9} & \frac{-2PS_o}{9} & \frac{-2PS_o}{9} & \frac{-2PS_o}{9} & \frac{-2PS_o}{9} \\ 0 & 0 & \frac{4PS_p}{9} & \frac{-4PS_p}{9} & 0 & 0 & 0 & 0 \\ \frac{PS_t}{3} & \frac{PS_t}{3} & \frac{-PS_t}{3} & \frac{-PS_t}{3} & 0 & 0 & 0 & 0 \\ \frac{4PS_p}{9} & \frac{-4PS_p}{9} & 0 & 0 & 0 & 0 & 0 & 0 \end{bmatrix} \quad [12]$$

where $PS_p$ is the pre-scaler applied to sub-channels associated with a pair of wires, $PS_t$ is the pre-scaler applied to sub-channels associated with a tetrad of wires and $PS_o$ is the pre-scaler applied to the sub-channel associated with an octad of wires.

The considerations in selecting the values for the pre-scalers are as follows. In the example above, $PS_t$ and $PS_o$ have a value greater than 1 to boost the three cross-pair sub-channels (sub-channels 1, 3 and 5) relative to the non-cross-pair sub-channels. The value of pre-scaler for the sub-channels associated with pairs of wires, $PS_p$, is set based on whether it is desired to keep the maximum signal swing constant relative to non-pre-scaled CNRZ-7.

In the case where it is to keep the maximum signal swing constant, the pre-scalers are set to values such that $$\frac{4PS_p}{9} + \frac{PS_t}{3} + \frac{2PS_o}{9} = 1.$$

Driver complexity can be reduced by setting $PS_t = PS_o$, i.e. the pre-scaler for the tetrads of wires has the same value as the pre-scaler for the octad of wires. It is not strictly necessary to maintain the maximum signal swing constant and pre-scaler values that cause variations in the maximum signal swing from a non-pre-scaled configuration are also possible. In this case, the maximum signal swing would be correspondingly adjusted in another block within the transmitter.

Table 4 below provides some exemplary pre-scaler values.

TABLE 4

| $PS_p$ | $PS_t$ | $PS_o$ | $PS_p$ Gain (dB) | $PS_t$ and $PS_o$ Gain (dB) |
| --- | --- | --- | --- | --- |
| 0.8125 | 1.15 | 1.15 | −1.803 | 1.214 |
| 0.9 | 1.125 | 1.125 | −0.915 | 1.023 |

Taking the first row as an example, this corresponds to a gain of −1.803 dB for the sub-channels carried by pairs of wires and a gain of 1.214 dB for the sub-channels carried by tetrads of wires and the octad of wires. That is, the tetrad and octad cross-pair sub-channels are boosted as the expense of the pair sub-channels. The overall gain for the system is approximately 1.2 dB with these pre-scaler values.

The second row has pre-scaler values that are equivalently expressed as 9/10 and 9/8—i.e. fractions having 9 in the numerator. Referring to equation [12], all of the elements have a factor of 9 in the denominator (when 1/3 is expressed as 3/9), meaning that the factor of 9 in the numerator of the pre-scalers cancels out with the factor of 9 in the denominator of the elements of the transmitter encoding matrix. This leads to the following pre-scaled transmitter encoding matrix (equation [13]).

$$\begin{bmatrix} 0 & 0 & 0 & 0 & 0 & 0 & \frac{2}{5} & \frac{-2}{5} \\ 0 & 0 & 0 & 0 & \frac{3}{8} & \frac{3}{8} & \frac{-3}{8} & \frac{-3}{8} \\ 0 & 0 & 0 & 0 & \frac{2}{5} & \frac{-2}{5} & 0 & 0 \\ \frac{1}{4} & \frac{1}{4} & \frac{1}{4} & \frac{1}{4} & \frac{-1}{4} & \frac{-1}{4} & \frac{-1}{4} & \frac{-1}{4} \\ 0 & 0 & \frac{2}{5} & \frac{-2}{5} & 0 & 0 & 0 & 0 \\ \frac{3}{8} & \frac{3}{8} & \frac{-3}{8} & \frac{-3}{8} & 0 & 0 & 0 & 0 \\ \frac{2}{5} & \frac{-2}{5} & 0 & 0 & 0 & 0 & 0 & 0 \end{bmatrix} \quad [13]$$

This pre-scaled CNRZ-7 transmitter encoding matrix has relatively simple elements, leading to a relatively simple driver construction. Selection of the pre-scaler values such that they interact with the elements of the transmitter encoding matrix in a manner that results in an alphabet that is relatively easy to generate using drivers can therefore be advantageous. Specifically, the pre-scaler values can be selected so that the product of each pre-scaler with the relevant elements of the transmission matrix produces a value that is relatively easy to configure a driver to generate.

It should be appreciated that it is not required to set $PS_t = PS_o$. This disclosure also contemplates configurations in which all of the pre-scalers take different values. This can achieve a better greater signal-to-noise ratio than the case where $PS_p = PS_o$ but increases the complexity of the drivers by a modest amount relative to non-pre-scaled CNRZ-7 coding. Further variations of this nature not expressly set out here are also within the scope of this disclosure.

Pre-scaled CNRZ-7 codes can make use of the same receiver matrix as non-pre-scaled CNRZ-7 codes, i.e. the receiver matrix shown in equation [11]. The pre-scaler technique can equally be applied to the variant CNRZ-7 codes shown in equation [9] or [10] using the principles explained in the immediately preceding few paragraphs. In the case of the CNRZ-7 code shown in connection with equation [10], use of a pre-scaler can bring the signal-to-noise ratio in line with other CNRZ-7 codes discussed herein.

Other types of CNRZ-based codes can also be pre-scaled where they include one or more cross-pair sub-channels. One such example is a CNRZ-5 code that requires six wires arranged in three pairs, for transmission of 5 bits per unit interval. The wires are grouped into a hexad of six wires, two triads of three wires each and two pairs of two wires each. The energy from each of the three sub-channel types in this code differs from the CNRZ-7 codes in that there are more combinations than the pair vs. cross-pair sub-channels that are present in a CNRZ-7 code. Nonetheless, even with this additional complexity the use of a pre-scaler in the case of CNRZ-5 codes gives added flexibility to increase the performance of a transceiver in a given channel.

The use of a pre-scaler with the exemplary CNRZ-5 code shown below can also improve the performance of this lower-complexity code since the two pair-oriented sub-channels are somewhat under-powered as compared to the higher complexity code that is described in equation [14].

A pre-scaled transmitter encoding matrix for an exemplary CNRZ-5 code is shown below as equation [14]. As above, the wires are labelled in ascending order from wire 0 and it is assumed that adjacent wires are arranged in pairs, i.e. wires 0 and 1 form a first pair, wires 2 and 3 form a second pair, and wires 4 and 5 form a third pair.

$$\begin{bmatrix} \frac{3PS_h}{8} & \frac{3PS_h}{8} & \frac{3PS_h}{8} & \frac{-3PS_h}{8} & \frac{-3PS_h}{8} & \frac{-3PS_h}{8} \\ 0 & 0 & 0 & \frac{PS_t}{4} & \frac{-PS_t}{2} & \frac{PS_t}{4} \\ 0 & 0 & 0 & \frac{-3PS_p}{8} & 0 & \frac{3PS_p}{8} \\ \frac{PS_t}{4} & \frac{-PS_t}{2} & \frac{PS_t}{4} & 0 & 0 & 0 \\ \frac{3PS_p}{8} & 0 & \frac{-3PS_p}{8} & 0 & 0 & 0 \end{bmatrix} \quad [14]$$

Figure 11:
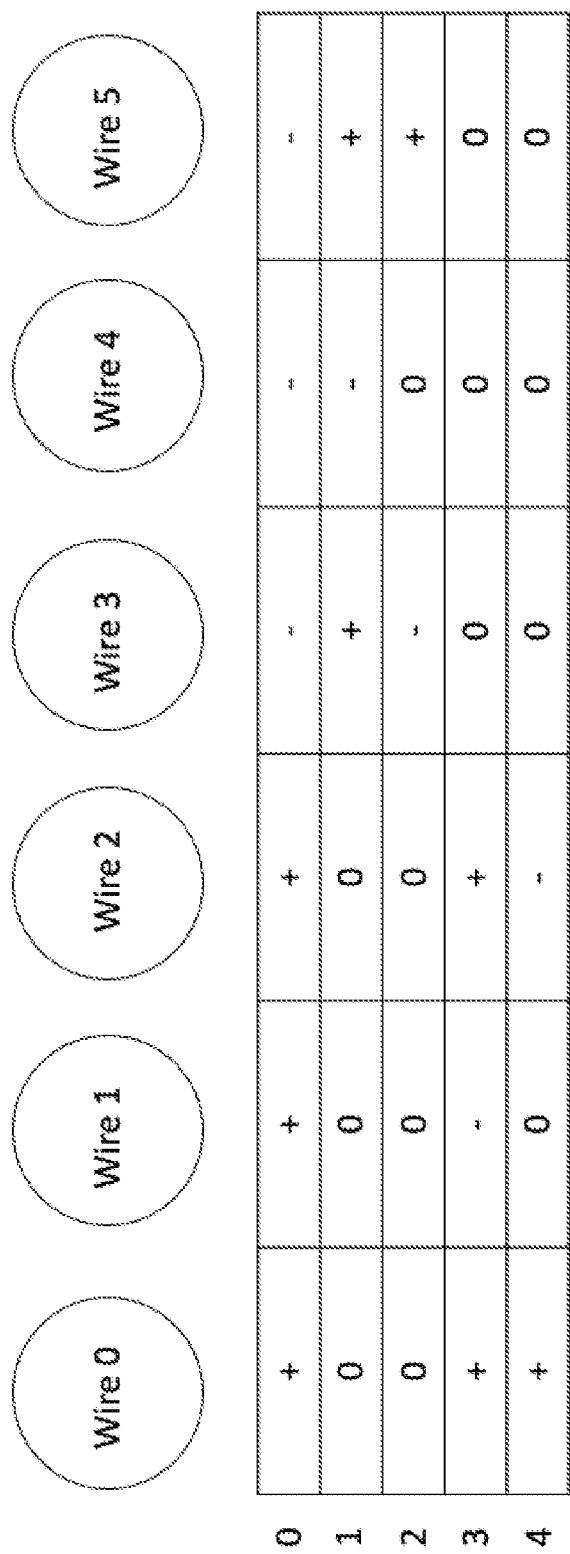

Here, $PS_h$ is the pre-scaler corresponding to the sub-channel carried by the hexad of wires, $PS_t$ is the pre-scaler corresponding to the sub-channels carried by respective triads of wires and $PS_p$ is the pre-scaler corresponding to the sub-channels carried by respective pairs of wires. As in the case of CNRZ-7, the pre-scaled CNRZ-5 transmitter encoding matrix does not superpose each bit over every wire. Instead, each wire carries a superposition of just some of the bits—e.g. the leftmost column of the matrix above, corresponding to wire 0, carries information relating to bits 0, 3 and 4. This is shown graphically in FIG. 11. Each wire is illustrated in FIG. 11 with a table below indicating whether the wire carries a positively-signed component of a given bit (+), a negatively-signed component of a given bit (−), or no component of a given bit (0). The sub-channel index is given to the left of the table. This can equivalently be thought of as each wire carrying on a subset of the total set of sub-channels, e.g. wire 0 carries only sub-channels 0, 3 and 4 in the example above (assuming the top row is sub-channel 0). The wires can be physically arranged as shown in FIG. 2A or 2B, for example, with it being appreciated that six wires are present in total rather than four.

As can be seen from both equation [14] and FIG. 11, the first sub-channel (corresponding to the top row of the pre-scaled CNRZ-5 weighting matrix, and sub-channel 0 in FIG. 11) carries same-signed signal components on wires 0 and 1, and also on wires 4 and 5. These wires are arranged in respective pairs, assuming a physical wire ordering from 0 to 5, and as such suffer from the cross-pair signal attenuation discussed above. The top row/sub-channel of equation [14], corresponding to the hexad of wires, is thus a cross-pair sub-channel.

It is possible to apply a pre-scaler to the CNRZ-5 transmitter encoding matrix to reduce the attenuation experienced by the cross-pair sub-channel. This is shown in equation [14] as $PS_h$.

The considerations in selecting the values for the pre-scalers are as follows. In the example of equation [14], $PS_h$ has a value greater than 1 to boost the cross-pair sub-channel that that hexad carries relative to the non-cross-pair sub-channels. The value of pre-scaler for the sub-channels associated with triads of wires and pairs of wires, $PS_p$ and $PS_t$, respectively, are set based on whether it is desired to keep the maximum signal swing constant relative to non-pre-scaled CNRZ-5.

In order to keep the maximum signal swing constant, the pre-scalers are set to values such that boost applied to the sub-channel corresponding to the hexad is offset by the attenuation of the triad and pair sub-channels. Driver complexity can be reduced by setting $PS_t = PS_p$, i.e. the pre-scaler for the triads of wires has the same value as the pre-scaler for the pairs of wires.

It is not strictly necessary to maintain the maximum signal swing constant and pre-scaler values that cause variations in the maximum signal swing from a non-pre-scaled configuration are also possible. In this case, the maximum signal swing would be correspondingly adjusted in another block within the transmitter.

A CNRZ-5 receiver decoding matrix that can be used to decode pre-scaled CNRZ-5 signals is shown below in equation [15]. Unlike the Hadamard-based ODVS receivers, in the case of CNRZ-5 some elements of receiver matrix do not have the value±1. It is however not necessary to account for the pre-scaler in the receiver decoding matrix. The wire corresponding to each row of the receiver matrix is shown to the left of the matrix itself.

$$\begin{array}{c} w_0 \\ w_1 \\ w_2 \\ w_3 \\ w_4 \\ w_5 \end{array} \begin{bmatrix} \frac{1}{3} & 0 & 0 & \frac{1}{2} & 1 \\ \frac{1}{3} & 0 & 0 & -1 & 0 \\ \frac{1}{3} & 0 & 0 & \frac{1}{2} & -1 \\ \frac{-1}{3} & \frac{1}{2} & -1 & 0 & 0 \\ \frac{-1}{3} & -1 & 0 & 0 & 0 \\ \frac{-1}{3} & \frac{1}{2} & 1 & 0 & 0 \end{bmatrix} \quad [15]$$

It will be appreciated that the ordering of rows and/or columns of the pre-scaled CNRZ-5 transmitter encoding matrix and receiver decoding matrix can be changed from that shown above without departing from the scope of this disclosure. Similarly, the sign of each element of either matrix can be swapped without departing from the scope of this disclosure.

Another CNRZ-5 code is shown below in equation [16]. This CNRZ-5 code is selected such that the signal to noise ratio for each sub-channel is largely the same, e.g. the signal to noise ratio of the sub-channels are within approximately 10% of each other. This can improve the overall performance of the link.

$$\begin{bmatrix} \frac{17}{64} & \frac{17}{64} & \frac{17}{64} & \frac{-17}{64} & \frac{-17}{64} & \frac{-17}{64} \\ 0 & 0 & 0 & \frac{9}{32} & \frac{-18}{32} & \frac{9}{32} \\ 0 & 0 & 0 & \frac{-29}{64} & 0 & \frac{29}{64} \\ \frac{9}{32} & \frac{-18}{32} & \frac{9}{32} & 0 & 0 & 0 \\ \frac{29}{64} & 0 & \frac{-29}{64} & 0 & 0 & 0 \end{bmatrix} \quad [16]$$

This variant CNRZ-5 code can also be pre-scaled in the same manner as discussed in respect of the earlier CNRZ-5 code introduced above in connection with equation [14]. The receiver decoding matrix for this variant CNRZ-5 code (whether pre-scaled or not) is that shown in equation [15].

Pre-scaled CNRZ-5 requires a six-wire bus essentially constructed as shown in FIG. 1, other than that there are six wires instead of four. Transmitter 107 is configured to generate pre-scaled CNRZ-5 codewords according to equation [16] and receiver 130 is configured to decode pre-scaled CNRZ-5 codewords according to equation [15]. The decoding can be performed by MICs 132 operating as discussed above in connection with FIG. 6A, with the difference that the inputs of each MIC are based on equation [15]. A given wire can be connected to multiple inputs of a given MIC to take account of the different magnitudes of the various elements of receiver decoding matrix [15]. This may require use of a MIC with more than four inputs, depending on the magnitudes of the decoding matrix elements.

Encoder 112 and drivers 118 can operate as described above with reference to FIGS. 3 to 5, with the difference that the encoding is based on equation [16]. Referring to FIG. 5 specifically, it will be appreciated that, unlike in the case of the Hadamard-based codes discussed above, each driver will not receive all of the input bits because each wire in CNRZ-5 does not carry signals relating to every bit. The sub-channel driver elements groups of FIG. 5 are selected with this in mind.

A further CNRZ-5 code is shown below in equation [17]. As before, the wires are labelled in ascending order from wire 0 and it is assumed that adjacent wires are arranged in pairs, i.e. wires 0 and 1 form a first pair, wires 2 and 3 form a second pair, and wires 4 and 5 form a third pair.

$$\begin{bmatrix} 0 & 0 & 0 & 0 & \frac{7}{15} & \frac{-7}{15} \\ \frac{1}{5} & \frac{1}{5} & \frac{1}{5} & \frac{1}{5} & \frac{-2}{5} & \frac{-2}{5} \\ 0 & 0 & \frac{7}{15} & \frac{-7}{15} & 0 & 0 \\ \frac{1}{3} & \frac{1}{3} & \frac{-1}{3} & \frac{-1}{3} & 0 & 0 \\ \frac{7}{15} & \frac{-7}{15} & 0 & 0 & 0 & 0 \end{bmatrix} \quad [17]$$

This CNRZ-5 code includes one hexad of wires, one tetrad of wires and three pairs of wires. Each pair of wire carries one bit, for three bits total. The tetrad carries one bit by comparing the signal on one of the pairs of wires in the tetrad with the signal on the other pair of wires in the tetrad. The hexad carries one bit by comparing the signal on two of the pairs of wires in the hexad with the other pair of wires in the hexad. A total of five bits per unit interval can thus be carried by this CNRZ-5 code.

The signal to noise ratio of this CNRZ-5 code is similar to the code shown in equation [16]. Advantageously, the CNRZ-5 code of equation [17] is particularly suited to being pre-scaled as the inherent asymmetry in the tetrad and hexad sets of wires is smoothed out by using a pre-scaler. The pre-scaler can be applied in the same manner as discussed above in respect of other CNRZ codes, as discussed in more detail later. Table 5 provides some information about the signal to noise ratio and eye openings for this CNRZ-5 code.

TABLE 5

| Sub-channel type | Eye opening ratio | Signal to noise penalty (dB) |
|---|---|---|
| Pair | 7/15 | 6.62 |
| Tetrad | 2/3 | 6.53 |
| Hexad | 4/5 | 6.71 |

In Table 5, the eye opening ratio and signal to noise penalty are expressed relative to differential NRZ.

The CNRZ-5 code of equation [17] requires a different decoding matrix from the other CNRZ-5 codes described herein. This variant decoding matrix is shown below in equation [18].

$$\begin{array}{c} w_0 \\ w_1 \\ w_2 \\ w_3 \\ w_4 \\ w_5 \end{array}\begin{bmatrix} -1 & -1 & 0 & 0 & 0 \\ -1 & -1 & 0 & 0 & 0 \\ 0 & 1 & -1 & -1 & 0 \\ 0 & 1 & 1 & -1 & 0 \\ 0 & 1 & 0 & 1 & -1 \\ 0 & 1 & 0 & 1 & 1 \end{bmatrix} \quad [18]$$

It is possible to optimise the CNRZ-5 code of equation [17] such that the signal-to-noise ratio on each of the sub-channels is the same, or very close to the same. This requires relatively minor adjustments to the elements of the transmitter encoding matrix, as shown below in equation [19].

$$\begin{bmatrix} 0 & 0 & 0 & 0 & 0.4673 & -0.4673 \\ 0.2023 & 0.2023 & 0.2023 & 0.2023 & -0.4046 & -0.4046 \\ 0 & 0 & 0.4673 & -0.4673 & 0 & 0 \\ 0.3304 & 0.3304 & -0.3304 & -0.3304 & 0 & 0 \\ 0.4673 & -0.4673 & 0 & 0 & 0 & 0 \end{bmatrix} \quad [19]$$

The decoding matrix of equation [18] can also be used with the encoding matrix of equation [19].

As mentioned above, a pre-scaler can be applied to the CNRZ-5 code of equation [17] or [19] to increase the overall signal to noise ratio. The cross-pair sub-channels in this case are the hexad sub-channel and the tetrad sub-channel. It is expected that this pre-scaled CNRZ-5 code will be particularly suited to environments in which the channel carrying the six wires includes high speed pair-oriented connectors, given that connectors that support high-speed multi-wire links directly are not widely available.

The pre-scaled version of the code of equation [17] is shown in equation [20].

$$\begin{bmatrix} 0 & 0 & 0 & 0 & \frac{7PS_p}{15} & \frac{-7PS_p}{15} \\ \frac{PS_h}{5} & \frac{PS_h}{5} & \frac{PS_h}{5} & \frac{PS_h}{5} & \frac{-2PS_h}{5} & \frac{-2PS_h}{5} \\ 0 & 0 & \frac{7PS_p}{15} & \frac{-7PS_p}{15} & 0 & 0 \\ \frac{PS_t}{3} & \frac{PS_t}{3} & \frac{-PS_t}{3} & \frac{-PS_t}{3} & 0 & 0 \\ \frac{7PS_p}{15} & \frac{-7PS_p}{15} & 0 & 0 & 0 & 0 \end{bmatrix} \quad [20]$$

Here, the subscript 'p' corresponds to a pair sub-channel, the subscript 't' corresponds to a tetrad sub-channel and the subscript 'h' corresponds to a hexad sub-channel.

As in the case of the codes above, the typical implementation of these CNRZ-5 codes is constrained by a set maximum signal swing whose properties are unrelated to the pre-scaler. In order to allow the pre-scaler to be used while still honoring that maximum signal swing, the following relationship can be used.

$$\frac{7PS_p}{15} + \frac{PS_t}{3} + \frac{PS_h}{5} = 1 \quad [21]$$

This keeps the maximum signal swing constant and can be thought of conceptually as redistributing power to the cross-pair sub-channel(s) from the other sub-channels. This is however not strictly necessary and pre-scaler values that cause variations in the maximum signal swing from a non-pre-scaled configuration are also possible. In this case, the maximum signal swing would be correspondingly adjusted in another block within the transmitter.

It is contemplated that in some cases it will be advantageous to set $PS_h=PS_t$. This simplifies the application of the pre-scaler and can reduce the complexity of the circuitry implementing the transmitter, particularly the drivers.

Another example of a CNRZ-type code that can benefit from a pre-scaler is a CNRZ-3 code. This requires four wires arranged in two pairs, for transmission of 3 bits per unit interval. The wires are grouped into one tetrad of wires and two pairs of two wires each.

A pre-scaled transmitter encoding matrix for an exemplary CNRZ-3 code is shown below as equation [22]. As above, the wires are labelled in ascending order from wire 0 and it is assumed that adjacent wires are arranged in pairs, i.e. wires 0 and 1 form a first pair, wires 2 and 3 form a second pair.

$$\begin{bmatrix} 0 & 0 & \frac{7PS_p}{12} & \frac{-7PS_p}{12} \\ \frac{5PS_t}{12} & \frac{5PS_t}{12} & \frac{-5PS_t}{12} & \frac{-5PS_t}{12} \\ \frac{7PS_p}{12} & \frac{-7PS_p}{12} & 0 & 0 \end{bmatrix} \quad [22]$$

Figure 12:
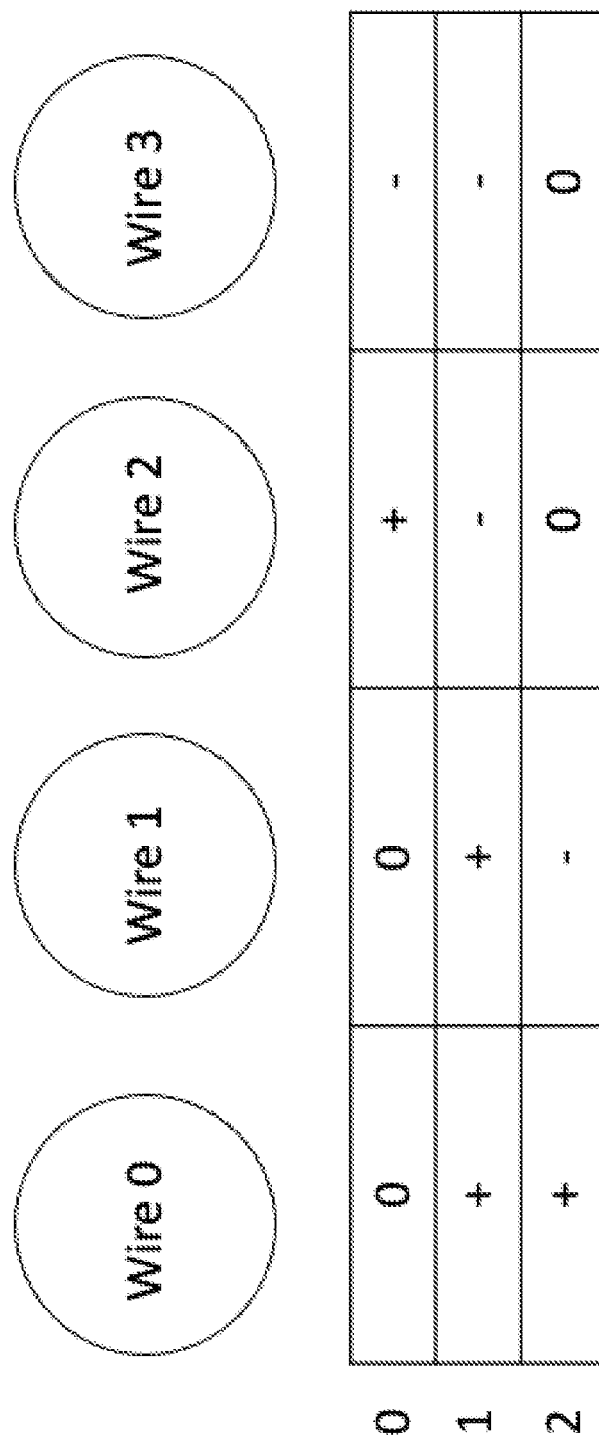

Here, $PS_t$ is the pre-scaler corresponding to the sub-channels carried by the tetrad of wires and $PS_p$ is the pre-scaler corresponding to the sub-channels carried by respective pairs of wires. As in the case of CNRZ-7 and CNRZ-5, the pre-scaled CNRZ-3 transmitter encoding matrix does not superpose each bit over every wire. Instead, each wire carries a superposition of just some of the bits— e.g. the leftmost column of the matrix above, corresponding to wire 0, carries information relating to bits 1 and 2. This is shown graphically in FIG. 12. Each wire is illustrated in FIG. 12 with a table below indicating whether the wire carries a positively-signed component of a given bit (+), a negatively-signed component of a given bit (−), or no component of a given bit (0). The sub-channel index is given to the left of the table. This can equivalently be thought of as each wire carrying on a subset of the total set of sub-channels, e.g. wire 0 carries only sub-channels 1 and 2 in the example above (assuming the top row is sub-channel 0). The wires can be physically arranged as shown in FIG. 2A or 2B, for example.

As can be seen from both equation [22] and FIG. 12, the second sub-channel (corresponding to the middle row of the pre-scaled CNRZ-3 transmitter encoding matrix, and sub-channel 1 in FIG. 12) carries same-signed signal components on wires 0 and 1, and also on wires 2 and 3. These wires are arranged in respective pairs, assuming a physical wire ordering from 0 to 3, and as such suffer from the cross-pair signal attenuation discussed above. The top row/sub-channel of equation [22], corresponding to the tetrad of wires, is thus a cross-pair sub-channel.

It is possible to apply a pre-scaler to the CNRZ-3 transmitter encoding matrix to reduce the excess attenuation experienced by the cross-pair sub-channel relative to the other sub-channels. This is shown in equation [22] as $PS_t$.

The considerations in selecting the values for the pre-scalers are as follows. In the example of equation [22], $PS_t$ has a value greater than 1 to boost the cross-pair sub-channel that that tetrad carries relative to the non-cross-pair sub-channels. The value of pre-scaler for the sub-channels associated with the pairs of wires, $PS_p$, is set based on whether it is desired to keep the maximum signal swing constant relative to non-pre-scaled CNRZ-3.

In order to keep the maximum signal swing constant, the pre-scalers are set to values such that $$\frac{7PS_p}{12} + \frac{5PS_t}{12} = 1.$$

Table 6 below provides some exemplary pre-scaler values under this constraint. It is not strictly necessary to maintain the maximum signal swing constant and pre-scaler values that cause variations in the maximum signal swing from a non-pre-scaled configuration are also possible. In this case, the maximum signal swing would be correspondingly adjusted in another block within the transmitter.

TABLE 6

| $PS_p$ | $PS_t$ | $PS_p$ Gain (dB) | $PS_t$ Gain (dB) |
|---|---|---|---|
| 0.786 | 1.3 | −2.095 | 2.279 |
| 0.857 | 1.2 | −1.339 | 1.584 |
| 0.929 | 1.1 | −0.644 | 0.828 |

Taking the second row as an example, this corresponds to a gain of −1.339 dB for the sub-channels carried by pairs of wires and a gain of 1.584 dB for the cross-pair sub-channel carried by tetrad of wires. That is, the tetrad cross-pair sub-channel is boosted at the expense of the pair sub-channels. The overall gain for the system is approximately 1.584 dB with these pre-scaler values.

The second row has pre-scaler values that are equivalently expressed as 12/14 and 12/10—i.e. fractions having 12 in the numerator. Referring to equation [22], all of the transmitter encoding matrix elements have a factor of 12 in the denominator, meaning that the factor of 12 in the numerator of the pre-scalers cancels out with the factor of 12 in the denominator of the elements of the transmitter encoding matrix. This leads to the following pre-scaled transmitter encoding matrix (equation [23]).

$$\begin{bmatrix} 0 & 0 & \frac{1}{2} & \frac{-1}{2} \\ 1 & 1 & \frac{-1}{2} & \frac{-1}{2} \\ \frac{1}{2} & \frac{1}{2} & \frac{1}{2} & \frac{1}{2} \\ \frac{1}{2} & \frac{-1}{2} & 0 & 0 \end{bmatrix} \quad [23]$$

This pre-scaled CNRZ-3 transmitter encoding matrix has relatively simple weights, leading to a relatively simple driver construction. Selection of the pre-scaler weights such that they interact with the weights of the transmitter encoding matrix in a manner that results in an alphabet that is relatively easy to generate using drivers can therefore be advantageous. Specifically, the pre-scaler values can be selected so that the product of each pre-scaler with the relevant elements of the transmitter encoding matrix produces a value that is relatively easy to configure a driver to generate.

A CNRZ-3 receiver decoding matrix that can be used to decode pre-scaled CNRZ-3 signals is shown below in equation [24]. It is not necessary to account for the pre-scaler in the receiver decoding matrix. The wire corresponding to each row of the receiver matrix is shown to the left of the matrix itself.

$$\begin{matrix} w_0 \\ w_1 \\ w_2 \\ w_3 \end{matrix} \begin{bmatrix} 0 & 1 & 1 \\ 0 & 1 & -1 \\ 1 & -1 & 0 \\ -1 & -1 & 0 \end{bmatrix} \quad [24]$$

It will be appreciated that the ordering of rows and/or columns of the pre-scaled CNRZ-3 transmitter encoding matrix and receiver decoding matrix can be changed from that shown above without departing from the scope of this disclosure. Additionally or alternatively, the sign of each element of the transmitter encoding matrix and receiver decoding matrix can be swapped without departing from the scope of this disclosure.

It will be apparent to a person skilled in the art having the benefit of the present disclosure that various modifications, extensions, substitutions and the like to the subject matter described herein are possible. Such changes are also within the scope of this disclosure. It is also noted that, where method steps are described, these steps can be performed in any order unless expressly stated otherwise.

The following clauses set out further embodiments of this disclosure, in addition to the embodiments described above.

Clause 1. A communication system comprising: a multi-wire bus having N wires arranged in pairs of wires, N being an integer greater than two and being a multiple of two; an orthogonal differential vector signalling encoder configured to receive a set of input bits and to responsively generate a set of symbols of a codeword of a vector signalling code, the codeword corresponding to a weighted summation of a plurality of sub-channel vectors that correspond to rows of a transmitter encoding matrix, the plurality of sub-channel vectors comprising at least one cross-pair sub-channel vector having same-signed vector components carried by at least one of the pairs of wires; and a set of drivers configured to transmit each symbol of the codeword over a respective wire of the multi-wire bus by driving the respective wire with a wire signal level, wherein for a given symbol of the vector signalling code, each driver of the set of drivers is configured to drive the wire signal level of the respective wire responsive to modulations of the at least one cross-pair sub-channel vector by a first amount more than modulations of at least one other sub-channel vector.

Clause 2. The communication system of clause 1, wherein the first amount is selectable based on a signal conductor environment of the N wires.

Clause 3. The communication system of clause 2, wherein the signal conductor environment is identified during a startup procedure.

Clause 4. The communication system of clause 2 or clause 3, wherein the signal conductor environment is a printed circuit board, wherein the N wires are traces on the printed circuit board and wherein a spacing between adjacent pairs of the N wires is greater than a spacing between each wire in each pair of wires.

Clause 5. The communication system of clause 2 or clause 3, wherein the signal conductor environment is an electrical cable comprising the N wires, and wherein a spacing between adjacent pairs of the N wires is greater than a spacing between each wire in the pair of wires.

Clause 6. The communication system of clause 2 or clause 3, wherein the signal conductor environment is an electrical cable comprising the N wires, each pair of wires having a respective shield arranged around each pair of wires.

Clause 7. The communication system of any preceding clause, wherein the encoder is further configured to receive the set of input bits and to responsively generate a respective set of control bits for each driver based on the received set of input bits, each set of control bits corresponding to one of the set of symbols.

Clause 8. The communication system of clause 7, wherein the encoder is configured to generate the respective set of control bits for each driver by mapping the set of input bits to the respective sets of control bits based on a lookup table.

Clause 9. The communication system of clause 8, wherein the encoder is further configured to map the set of input bits to the respective sets of control bits based on one or more configuration bits.

Clause 10. The communication system of clause 9, further comprising a configuration controller configured to provide the configuration bits to the encoder.

Clause 11. The communication system of clause 10, wherein the configuration controller is configured to set a value of the one or more configuration bits during a startup procedure.

Clause 12. The communication system of clause 10, wherein the configuration controller is configured to set a value of the one or more configuration bits in response to an instruction from an external controller.

Clause 13. The communication system of any one of clauses 8 to 12, wherein the lookup table is implemented using one or more logic circuits.

Clause 14. The communication system of any one of clauses 1 to 6: wherein the encoder is configured to generate respective sets of signed input bits for each driver of the set of drivers, each respective set of signed input bits comprising at least one signed input bit, the or each signed input bit generated by applying a sign to a respective input bit of the set of input bits based on a sign of a wire-specific sub-channel element of a corresponding sub-channel vector of the plurality of sub-channel vectors; wherein each driver of the set of drivers comprises a plurality of sub-channel driver element groups configured to generate a plurality of weighted analog signal components, each sub-channel driver element group configured to accept a respective signed input bit of the respective set of signed input bits at a number of enabled driver elements connected in parallel, the number of enabled driver elements determined by the wire-specific sub-channel element; and a summation node connected to the respective wire, the summation node configured to generate the respective signal for transmission over the wire by forming a summation of the plurality of weighted analog signal components.

Clause 15. The communication system of clause 14, wherein a first sub-channel driver element group associated with the cross-pair sub-channel vector is configured to be adjustable by changing the number of enabled driver elements in the first sub-channel driver element group.

Clause 16. The communication system of clause 15, wherein a second sub-channel driver element group associated with one of the at least one other sub-channel vectors is configured to be adjustable by changing the number of enabled driver elements in the second sub-channel driver element group.

Clause 17. The communication system of clause 15 or clause 16, wherein the number of enabled driver elements in the first sub-channel driver element group is selectable.

Clause 18. The communication system of any one of clauses 15 to 17, wherein the number of enabled driver elements in the first sub-channel driver element group is selected based on one or more values stored in one or more registers.

Clause 19. The communication system of clause 18, wherein the one or more values are written to the one or more registers during a startup procedure based on a signal conductor environment of the N wires.

Clause 20. The communication system of any preceding clause, further comprising: one or more modulation circuits each coupled to the encoder, each modulation circuit configured to: receive the set of symbols from the encoder; and generate a set of carrier-modulated symbols from the received set of symbols; wherein the set of drivers are configured to transmit the set of carrier-modulated symbols on the N wires.

Clause 21. The communication system of clause 20, wherein the encoder is further configured to generate a set of baseband symbols based on a second set of input bits and to output the set of baseband symbols to the set of drivers, the drivers configured to form a superposition of the carrier-modulated symbols and the baseband symbols on the N wires.

Clause 22. The communication system of clause 21, wherein the set of baseband symbols are generated based on a cross-pair sub-channel vector having a different pre-scaling factor than the cross-pair sub-channel vector within the carrier modulated symbols.

Clause 23. The communication system of any preceding clause, wherein the set of input bits correspond to pulse-amplitude modulated encoded bits, wherein the number of levels in a pulse-amplitude modulation scheme used to encode the pulse-amplitude modulated encoded bits is at least three.

Clause 24. The communication system of any preceding clause, further comprising a pre-encoder configured to generate the set of input bits from a current set of bits and a previously-transmitted set of bits.

Clause 25. The communication system of clause 24, wherein the pre-encoder is configured to generate the set of input bits from the current set of bits and the previously-transmitted set of bits according to a precode selected from the group consisting of: an error-correction code, a dicode, and a Class 2 code.

Clause 26. The communication system of any preceding clause, wherein the transmitter encoding matrix is a Hadamard matrix, the at least one cross-pair sub-channel vector has same-signed vector components carried by each pair of wires and N is a power of two.

Clause 27. The communication system of clause 26, wherein the set of input bits is three bits.

Clause 28. The communication system of clause 27, wherein the Hadamard matrix is a size four Hadamard matrix.

Clause 29. The communication system of clause 27, wherein N=4.

Clause 30. The communication system of clause 26, wherein the set of input bits is seven bits.

Clause 31. The communication system of clause 30, wherein the Hadamard matrix is a size eight Hadamard matrix.

Clause 32. The communication system of clause 31, wherein N=8.

Clause 33. The communication system of any one of clauses 1 to 25, wherein at least one of the plurality of sub-channel vectors is associated with only a sub-set of the N wires.

Clause 34. The communication system of clause 33, wherein N=8, four of the plurality of sub-channel vectors are pair sub-channel vectors having non-zero elements associated with only two of the eight wires, two of the plurality of sub-channel vectors are tetrad sub-channel vectors having non-zero elements associated with only four of the eight wires, and one of the plurality of sub-channel vectors is an octad sub-channel vector having non-zero elements associated with all of the eight wires.

Clause 35. The communication system of clause 33, wherein N=6, two of the plurality of sub-channel vectors are pair sub-channel vectors having non-zero elements associated with only two of the six wires, two of the plurality of sub-channel vectors are triad sub-channel vectors having non-zero elements associated with only three of the six wires, and one of the plurality of sub-channel vectors is a hexad sub-channel vector having non-zero elements associated with all of the six wires.

Clause 36. The communication system of clause 33, wherein N=6, three of the plurality of sub-channel vectors are pair sub-channel vectors having non-zero elements associated with only two of the six wires, one of the plurality of sub-channel vectors is a tetrad sub-channel vector having non-zero elements associated with only four of the six wires, and one of the plurality of sub-channel vectors is a hexad sub-channel vector having non-zero elements associated with all of the six wires.

Clause 37. The communication system of clause 33, wherein N=4, two of the plurality of sub-channel vectors are pair sub-channel vectors having non-zero elements associated with only two of the four wires, and one of the plurality of sub-channel vectors is a tetrad sub-channel vector having non-zero elements associated with all of the four wires.

Clause 38. A method, comprising: providing a multi-wire bus having N wires arranged in pairs of wires, N being an integer greater than 2 and being a multiple of two; receiving, by an orthogonal differential vector signalling encoder, a set of input bits and responsively generating a set of symbols of a codeword of a vector signalling code, the codeword corresponding to a weighted summation of a plurality of sub-channel vectors that correspond to rows of a transmitter encoding matrix, the plurality of sub-channel vectors comprising at least one cross-pair sub-channel vector having same-signed vector components carried by at least one of the pairs of wires; and transmitting, by a set of drivers, each symbol of the codeword over a respective wire of the multi-wire bus by driving the respective wire with a wire signal level, wherein for a given symbol of the vector signalling code, each driver of the set of drivers drives the wire signal level of the respective wire responsive to modulations of the at least one cross-pair sub-channel vector by a first amount more than modulations of at least one other sub-channel vector.

Clause 39. The method of clause 38, further comprising selecting the first amount based on a signal conductor environment of the N wires.

Clause 40. The method of clause 39, further comprising identifying the signal conductor environment during a startup procedure.

Clause 41. The method of clause 39 or clause 40, wherein the signal conductor environment is a printed circuit board, wherein the N wires are traces on the printed circuit board and wherein a spacing between adjacent pairs of the N wires is greater than a spacing between each wire in each pair of wires.

Clause 42. The method of clause 39 or clause 40, wherein the signal conductor environment is an electrical cable comprising the N wires, and wherein a spacing between adjacent pairs of the N wires is greater than a spacing between each wire in the pair of wires.

Clause 43. The method of clause 39 or clause 40, wherein the signal conductor environment is an electrical cable comprising the N wires, each pair of wires having a respective shield arranged around each pair of wires.

Clause 44. The method of any one of clauses 37 to 43, further comprising the encoder, responsive to receiving the set of input bits, generating a respective set of control bits for each driver based on the received set of input bits, each set of control bits corresponding to one of the set of symbols.

Clause 45. The method of clause 44, wherein the encoder generating the respective set of control bits for each driver comprises the encoder mapping the set of input bits to the respective sets of control bits based on a lookup table.

Clause 46. The method of clause 45, further comprising the encoder mapping the set of input bits to the respective sets of control bits based on one or more configuration bits.

Clause 47. The method of clause 46, further comprising a configuration controller providing the configuration bits to the encoder.

Clause 48. The method of clause 47, further comprising the configuration controller setting a value of the one or more configuration bits during a startup procedure.

Clause 49. The method of clause 47, further comprising the configuration controller setting a value of the one or more configuration bits in response to an instruction from an external controller.

Clause 50. The method of any one of clauses 45 to 49, wherein the lookup table is implemented using one or more logic circuits.

Clause 51. The method of any one of clauses 38 to 44, further comprising: the encoder generating respective sets of signed input bits for each driver of the set of drivers, each respective set of signed input bits comprising at least one signed input bit, the or each signed input bit generated by applying a sign to a respective input bit of the set of input bits based on a sign of a wire-specific sub-channel element of a corresponding sub-channel vector of the plurality of sub-channel vectors; and each driver of the set of drivers generating a plurality of weighted analog signal components using a plurality of sub-channel driver element groups, each sub-channel driver element group accepting a respective signed input bit of the respective set of signed input bits at a number of enabled driver elements connected in parallel, the number of enabled driver elements determined by the wire-specific sub-channel element; and generating, by a summation node connected to the respective wire, the respective signal for transmission over the wire by forming a summation of the plurality of weighted analog signal components.

Clause 52. The method of clause 51, further comprising adjusting a first sub-channel driver element group associated with the cross-pair sub-channel vector by changing the number of enabled driver elements in the first sub-channel driver element group.

Clause 53. The method of clause 52, further comprising adjusting a second sub-channel driver element group associated with one of the at least one other sub-channel vectors by changing the number of enabled driver elements in the second sub-channel driver element group.

Clause 54. The method of clause 52 or clause 53, further comprising selecting the number of enabled driver elements in the first sub-channel driver element group.

Clause 55. The method of any one of clauses 52 to 54, further comprising selecting the number of enabled driver elements in the first sub-channel driver element group based on one or more values stored in one or more registers.

Clause 56. The method of clause 55, further comprising writing the one or more values to the one or more registers during a startup procedure based on a signal conductor environment of the N wires.

Clause 57. The method of any one of clauses 38 to 56, further comprising operating one or more modulation circuits that are each coupled to the encoder to: receive the set of symbols from the encoder; and generate a set of carrier-modulated symbols from the received set of symbols; the method further comprising the set of drivers transmitting the set of carrier-modulated symbols on the N wires.

Clause 58. The method of clause 57, further comprising the encoder generating a set of baseband symbols based on a second set of input bits and outputting the set of baseband symbols to the set of drivers, the drivers forming a superposition of the carrier-modulated symbols and the baseband symbols on the N wires.

Clause 59. The method of clause 58, wherein the set of baseband symbols are generated based on a cross-pair sub-channel vector having a different pre-scaling factor than the cross-pair sub-channel vector within the carrier modulated symbols.

Clause 60. The method of any one of clauses 38 to 59, wherein the set of input bits correspond to pulse-amplitude modulated encoded bits, wherein the number of levels in a pulse-amplitude modulation scheme used to encode the pulse-amplitude modulated encoded bits is at least three.

Clause 61. The method of any one of clauses 38 to 60, further comprising a pre-encoder generating the set of input bits from a current set of bits and a previously-transmitted set of bits.

Clause 62. The method of clause 61, wherein the pre-encoder generates the set of input bits from the current set of bits and the previously-transmitted set of bits according to a precode selected from the group consisting of: an error-correction code, a dicode, and a Class 2 code.

Clause 63. The method of any one of clauses 38 to 62, wherein the transmitter encoding matrix is a Hadamard matrix, the at least one cross-pair sub-channel vector has same-signed vector components carried by each pair of wires and N is a power of two.

Clause 64. The method of clause 63, wherein the set of input bits is three bits.

Clause 65. The method of clause 64, wherein the Hadamard matrix is a size four Hadamard matrix.

Clause 66. The method of clause 65, wherein N=4.

Clause 67. The method of clause 63, wherein the set of input bits is seven bits.

Clause 68. The method of clause 67, wherein the Hadamard matrix is a size eight Hadamard matrix.

Clause 69. The method of clause 68, wherein N=8.

Clause 70. The method of any one of clauses 38 to 62, wherein at least one of the plurality of sub-channel vectors is associated with only a sub-set of the N wires.

Clause 71. The method of clause 70, wherein N=8, four of the plurality of sub-channel vectors are pair sub-channel vectors having non-zero elements associated with only two of the eight wires, two of the plurality of sub-channel vectors are tetrad sub-channel vectors having non-zero elements associated with only four of the eight wires, and one of the plurality of sub-channel vectors is an octad sub-channel vector having non-zero elements associated with all of the eight wires.

Clause 72. The method of clause 70, wherein N=6, two of the plurality of sub-channel vectors are pair sub-channel vectors having non-zero elements associated with only two of the six wires, two of the plurality of sub-channel vectors are triad sub-channel vectors having non-zero elements associated with only three of the six wires, and one of the plurality of sub-channel vectors is a hexad sub-channel vector having non-zero elements associated with all of the six wires.

Clause 73. The method of clause 70, wherein N=6, three of the plurality of sub-channel vectors are pair sub-channel vectors having non-zero elements associated with only two of the six wires, one of the plurality of sub-channel vectors is a tetrad sub-channel vector having non-zero elements associated with only three of the six wires, and one of the plurality of sub-channel vectors is a hexad sub-channel vector having non-zero elements associated with all of the six wires.

Clause 74. The method of clause 70, wherein N=4, two of the plurality of sub-channel vectors are pair sub-channel vectors having non-zero elements associated with only two of the four wires, and one of the plurality of sub-channel vectors is a tetrad sub-channel vector having non-zero elements associated with all of the four wires.

The invention claimed is:

1. A communication system comprising:
a multi-wire bus having N wires arranged in pairs of wires, N being an integer greater than two and being a multiple of two;
an orthogonal differential vector signalling encoder configured to receive a set of input bits and to responsively generate a set of symbols of a codeword of a vector signalling code, the codeword corresponding to a weighted summation of a plurality of sub-channel vectors that correspond to rows of a transmitter encoding matrix, the plurality of sub-channel vectors comprising at least one cross-pair sub-channel vector having same-signed vector components carried by at least one of the pairs of wires; and
a set of drivers configured to transmit each symbol of the codeword over a respective wire of the multi-wire bus by driving the respective wire with a wire signal level, wherein for a given symbol of the vector signalling code, each driver of the set of drivers is configured to drive the wire signal level of the respective wire responsive to modulations of the at least one cross-pair sub-channel vector by a first amount more than modulations of at least one other sub-channel vector.

2. The communication system of claim 1, wherein the first amount is selectable based on a signal conductor environment of the N wires, and wherein the signal conductor environment is a printed circuit board, the N wires are traces on the printed circuit board and a spacing between adjacent pairs of the N wires is greater than a spacing between each wire in each pair of wires.

3. The communication system of claim 1, wherein the first amount is selectable based on a signal conductor environment of the N wires, and wherein the signal conductor environment is an electrical cable comprising the N wires, a spacing between adjacent pairs of the N wires being greater than a spacing between each wire in the pair of wires.

4. The communication system of claim 1, wherein the first amount is selectable based on a signal conductor environment of the N wire, and wherein the signal conductor environment is an electrical cable comprising the N wires, each pair of wires having a respective shield arranged around each pair of wires.

5. The communication system of claim 1, wherein the transmitter encoding matrix is a Hadamard matrix, the at least one cross-pair sub-channel vector has same-signed vector components carried by each pair of wires and N is a power of two.

6. The communication system of claim 1, wherein at least one of the plurality of sub-channel vectors is associated with only a sub-set of the N wires.

7. The communication system of claim 6, wherein N=8, four of the plurality of sub-channel vectors are pair sub-channel vectors having non-zero elements associated with only two of the eight wires, two of the plurality of sub-channel vectors are tetrad sub-channel vectors having non-zero elements associated with only four of the eight wires, and one of the plurality of sub-channel vectors is an octad sub-channel vector having non-zero elements associated with all of the eight wires.

8. The communication system of claim 6, wherein N=6, two of the plurality of sub-channel vectors are pair sub-channel vectors having non-zero elements associated with only two of the six wires, two of the plurality of sub-channel vectors are triad sub-channel vectors having non-zero elements associated with only three of the six wires, and one of the plurality of sub-channel vectors is a hexad sub-channel vector having non-zero elements associated with all of the six wires.

9. The communication system of claim 6, wherein N=6, three of the plurality of sub-channel vectors are pair sub-channel vectors having non-zero elements associated with only two of the six wires, one of the plurality of sub-channel vectors is a tetrad sub-channel vector having non-zero elements associated with only four of the six wires, and one of the plurality of sub-channel vectors is a hexad sub-channel vector having non-zero elements associated with all of the six wires.

10. The communication system of claim 6, wherein N=4, two of the plurality of sub-channel vectors are pair sub-channel vectors having non-zero elements associated with only two of the four wires, and one of the plurality of sub-channel vectors is a tetrad sub-channel vector having non-zero elements associated with all of the four wires.

11. A method, comprising:
providing a multi-wire bus having N wires arranged in pairs of wires, N being an integer greater than 2 and being a multiple of two;
receiving, by an orthogonal differential vector signalling encoder, a set of input bits and responsively generating a set of symbols of a codeword of a vector signalling code, the codeword corresponding to a weighted summation of a plurality of sub-channel vectors that correspond to rows of a transmitter encoding matrix, the plurality of sub-channel vectors comprising at least one cross-pair sub-channel vector having same-signed vector components carried by at least one of the pairs of wires; and
transmitting, by a set of drivers, each symbol of the codeword over a respective wire of the multi-wire bus by driving the respective wire with a wire signal level, wherein for a given symbol of the vector signalling code, each driver of the set of drivers drives the wire signal level of the respective wire responsive to modulations of the at least one cross-pair sub-channel vector by a first amount more than modulations of at least one other sub-channel vector.

12. The method of claim 11, further comprising selecting the first amount based on a signal conductor environment of the N wires, wherein the signal conductor environment is a printed circuit board, the N wires are traces on the printed circuit board and a spacing between adjacent pairs of the N wires is greater than a spacing between each wire in each pair of wires.

13. The method of claim 11, further comprising selecting the first amount based on a signal conductor environment of the N wires, wherein the signal conductor environment is an electrical cable comprising the N wires, and wherein a spacing between adjacent pairs of the N wires is greater than a spacing between each wire in the pair of wires.

14. The method of claim 11, wherein the signal conductor environment is an electrical cable comprising the N wires, each pair of wires having a respective shield arranged around each pair of wires.

15. The method of claim 11, wherein the transmitter encoding matrix is a Hadamard matrix, the at least one cross-pair sub-channel vector has same-signed vector components carried by each pair of wires and N is a power of two.

16. The method of claim 11, wherein at least one of the plurality of sub-channel vectors is associated with only a sub-set of the N wires.

17. The method of claim 16, wherein N=8, four of the plurality of sub-channel vectors are pair sub-channel vectors having non-zero elements associated with only two of the eight wires, two of the plurality of sub-channel vectors are tetrad sub-channel vectors having non-zero elements associated with only four of the eight wires, and one of the plurality of sub-channel vectors is an octad sub-channel vector having non-zero elements associated with all of the eight wires.

18. The method of claim 16, wherein N=6, two of the plurality of sub-channel vectors are pair sub-channel vectors having non-zero elements associated with only two of the six wires, two of the plurality of sub-channel vectors are triad sub-channel vectors having non-zero elements associated with only three of the six wires, and one of the plurality of sub-channel vectors is a hexad sub-channel vector having non-zero elements associated with all of the six wires.

19. The method of claim 16, wherein N=6, three of the plurality of sub-channel vectors are pair sub-channel vectors having non-zero elements associated with only two of the six wires, one of the plurality of sub-channel vectors is a tetrad sub-channel vector having non-zero elements associated with only four of the six wires, and one of the plurality of sub-channel vectors is a hexad sub-channel vector having non-zero elements associated with all of the six wires.

20. The method of claim 16, wherein N=4, two of the plurality of sub-channel vectors are pair sub-channel vectors having non-zero elements associated with only two of the four wires, and one of the plurality of sub-channel vectors is a tetrad sub-channel vector having non-zero elements associated with all of the four wires.

* * * * *